(12) United States Patent
White et al.

(10) Patent No.: US 11,698,981 B2
(45) Date of Patent: Jul. 11, 2023

(54) SYSTEMS AND METHODS FOR CLIENT-SIDE AND FIELD-LEVEL ENCRYPTION WITH DYNAMIC SCHEMA DATABASES

(71) Applicant: MongoDB, Inc., New York, NY (US)

(72) Inventors: Kenneth White, New York, NY (US); Mark Benvenuto, New York, NY (US); Kevin Albertson, New York, NY (US); David Lenox Storch, Brooklyn, NY (US); Eliot Horowitz, New York, NY (US)

(73) Assignee: MongoDB, Inc., New York, NY (US)

( * ) Notice: Subject to any disclaimer, the term of this patent is extended or adjusted under 35 U.S.C. 154(b) by 217 days.

(21) Appl. No.: 16/895,503

(22) Filed: Jun. 8, 2020

(65) Prior Publication Data
US 2020/0394317 A1 Dec. 17, 2020

Related U.S. Application Data

(60) Provisional application No. 62/861,978, filed on Jun. 14, 2019.

(51) Int. Cl.
*G06F 16/20* (2019.01)
*G06F 21/60* (2013.01)
*H04L 9/14* (2006.01)
*G06F 16/21* (2019.01)

(52) U.S. Cl.
CPC .......... *G06F 21/602* (2013.01); *G06F 16/213* (2019.01); *H04L 9/14* (2013.01)

(58) Field of Classification Search
CPC .......... G06F 16/213; G06F 21/602; H04L 9/14
See application file for complete search history.

(56) References Cited

U.S. PATENT DOCUMENTS

| | | | |
|---|---|---|---|
| 9,305,590 B2* | 4/2016 | Miller | G11B 20/00492 |
| 10,560,457 B2* | 2/2020 | Anderson | G06F 16/245 |
| 2003/0018910 A1* | 1/2003 | Wert | H04L 63/083 |
| | | | 726/27 |
| 2006/0080535 A1* | 4/2006 | Elazar | G06F 21/10 |
| | | | 713/176 |
| 2006/0259950 A1* | 11/2006 | Mattsson | G06F 21/6218 |
| | | | 726/1 |

(Continued)

*Primary Examiner* — Tarek Chbouki
(74) *Attorney, Agent, or Firm* — Wolf, Greenfield & Sacks, P.C.

(57) ABSTRACT

A database system comprising a database having a dynamic schema and comprising a plurality of data storage nodes; and at least one processor configured to, using an encryption process: manage access to plaintext data stored in the plurality of data storage nodes by users employing at least one client-controlled resource in a client access layer; restrict access to the plaintext data by other users, wherein the other users include users with system administration privileges for the database and administrators of processing resources hosting the database; and manage access to encrypted copies of the plaintext data by the users with system administration privileges for the database such that the system administration privileges do not enable access to plaintext versions of the encrypted copies. A method for managing data security for a database. A database system with a dynamic schema architecture, a client access layer, and an operational database layer.

20 Claims, 18 Drawing Sheets

(56) References Cited

U.S. PATENT DOCUMENTS

| | | | |
|---|---|---|---|
| 2014/0181433 A1* | 6/2014 | Pfeffer | G06F 3/0622 |
| | | | 711/163 |
| 2017/0006018 A1* | 1/2017 | Campagna | H04L 63/062 |
| 2017/0126681 A1* | 5/2017 | Barrett | H04L 9/3226 |
| 2019/0065763 A1* | 2/2019 | Berg | H04L 9/3239 |
| 2019/0213346 A1* | 7/2019 | Friedman | G06F 21/6218 |
| 2020/0034528 A1* | 1/2020 | Yang | H04L 9/088 |

* cited by examiner

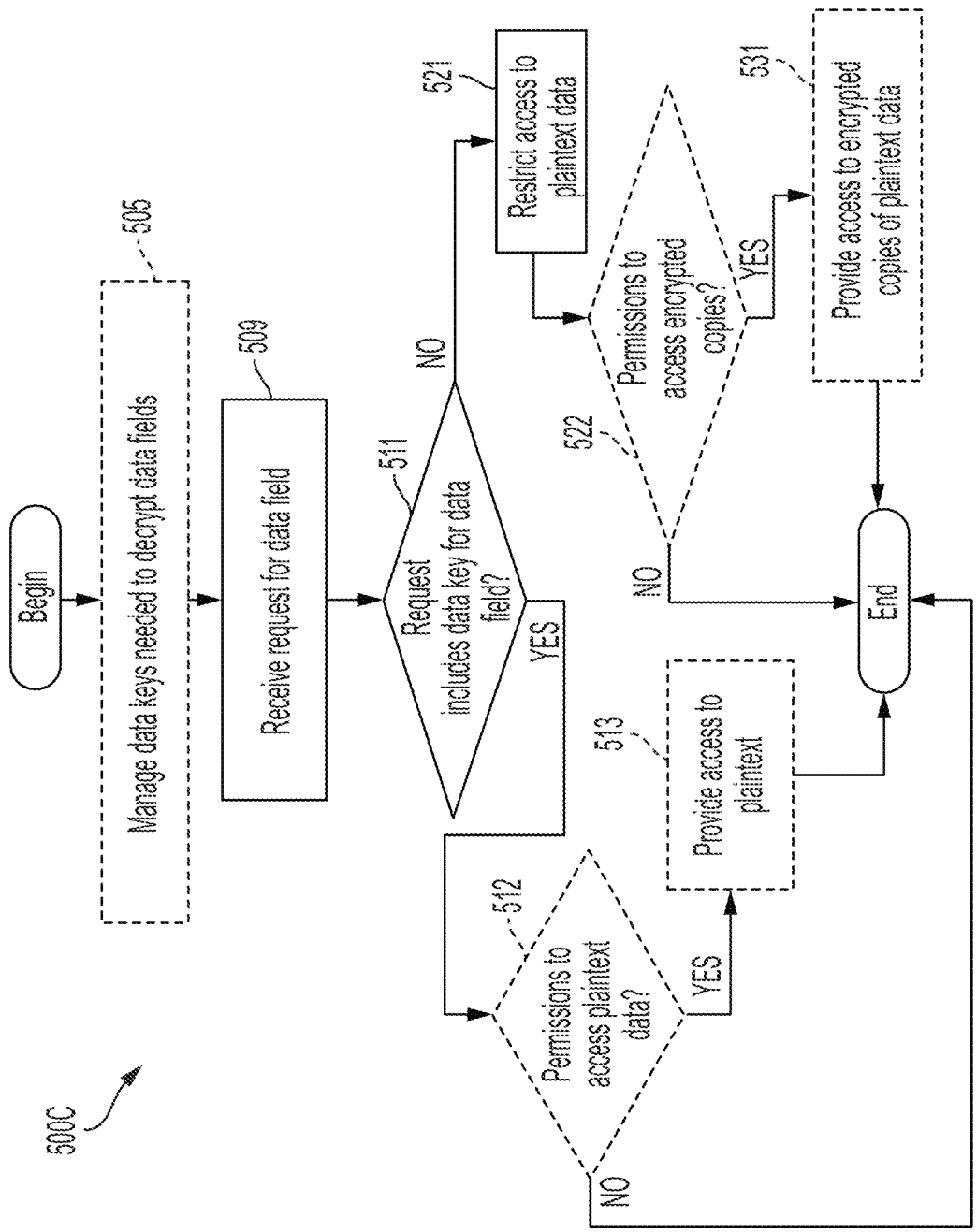

| Name | Type | Description |
|---|---|---|
| _id | UUID | A unique identifier for the key. |
| version | int64 | A numeric identifier for the schema version of this document. Implicitly 0 if unset. |
| keyAltName | Array of BSON scalar values | Alternate names to search for keys by. Used for a per-document key scenario in support of GDPR scenarios. BSON values other than document, array, or code_with_scope are permitted. |
| keyMaterial | BinData | Encrypted data key material, BinData type General |
| creationDate | Date | The datetime the wrapped key was imported into the Key Database. |
| updateDate | Date | The datetime the wrapped key was last modified. On initial import, this value will be set creationDate. |
| status | int | 0 = enabled, 1 = disabled |
| masterKey | Document | Per provider master key definition |

FIG. 9C

| Name | Type | Description |
|---|---|---|
| provider | String | The fixed value "aws". More providers may be available. |
| awsKey | String | AWS ARN |
| awsRegion | String | AWS Region that contains AWS ARN |

FIG. 9D

| Name | Type | Description |
|---|---|---|
| bsonType | string | The bson Type of the underlying encrypted field. |
| algorithm | string | "AEAD_AES_256_CBC_HMAC_SHA_512-Random" or "AEAD_AES_256_CBC_HMAC_SHA_512-Deterministic" |
| initialization Vector | bindata | May only be present if algorithm "AEAD_AES_256_CBC_HMAC_SHA_512TBD-Deterministic" is chosen. It is of length N (which N may be chosen in drivers design spec based on the encryption algorithm used). May have no validation effect. Inheritable from encryptMetadata.<br><br>Initialization Vector customization is provided so that users can opt to have unique IVs per collection when using deterministic encryption or to share IVs across collections to support $lookup. |
| keyId | string or array of UUID | If string, it is a JSON pointer to a field with a scalar value identifying a key by keyAltName.<br><br>If array, an array of eligible keys. |

FIG. 9E

| Type | Exemplary Name | Exemplary Blob Description |
|---|---|---|
| 0 | Intent-to-encrypt marking | Contains unencrypted data that will be encrypted (by libmongocrypt) along with metadata describing how to encrypt it. |
| 1 | AEAD_AES_CBC_HMAC_SHA512 deterministic ciphertext | The metadata and encrypted data for deterministic encrypted data. |
| 2 | AEAD_AES_CBC_HMAC_SHA512 randomized ciphertext | The metadata and encrypted data for random encrypted data. |

FIG. 10A

| Exemplary Name | Exemplary Description |
|---|---|
| fle_blob_subtype | Type of blob format and encryption algorithm used. |
| key_uuid [16] | The value of _id for the key used to decrypt the ciphertext. |
| original_bson_type | The byte representing the original BSON type of the encrypted data. |
| ciphertext[] | The encrypted ciphertext (includes IV prepended). |

FIG. 10B

| Type | Base BSON Size | Minimal BSON Overhead |
|---|---|---|
| MinKey | 0 | N/A |
| NumberDouble | 8 | 87 |
| String | 5 | 87 |
| Object | 5 | 87 |
| Array | 5 | 87 |
| BinData | 5 | 87 |
| Undefined | 0 | N/A |
| ObjectID | 12 | 87 |
| Bool False | 0 | N/A |
| Bool True | 0 | N/A |
| Date | 8 | 87 |
| NULL | 0 | N/A |
| RegEx | 2 | 87 |
| DBRef | 5+12 | 103 |
| Code | 5 | 87 |
| Symbol | 5 | 87 |
| CodeWScope | 4+5+5 | 87 |
| NumberInt | 4 | 87 |
| Timestamp | 8 | 87 |
| NumberLong | 8 | 87 |
| NumberDecimal | 16 | 103 |
| MaxKey | 0 | N/A |

FIG. 10C

SYSTEMS AND METHODS FOR CLIENT-SIDE AND FIELD-LEVEL ENCRYPTION WITH DYNAMIC SCHEMA DATABASES

CROSS-REFERENCE TO RELATED APPLICATIONS

This application claims priority under 35 U.S.C. § 119(e) to U.S. Provisional Application Ser. No. 62/861,978, entitled "SYSTEMS AND METHODS FOR CLIENT-SIDE AND FIELD-LEVEL ENCRYPTION WITH DYNAMIC SCHEMA DATABASES," filed on Jun. 14, 2019, which is herein incorporated by reference in its entirety.

BACKGROUND

Data security is becoming increasingly important as more sensitive data is stored by more parties, and as increasingly stringent regulations are enacted and agreements are demanded to help counteract widespread data theft, leaks, breaches, etc.

SUMMARY

The inventors have recognized and appreciated that data holders with high-sensitivity workloads running on- and off-premises may require additional technical options to control and limit access to confidential and regulated data. The inventors have recognized that one way to handle the sensitivity of certain workloads and comply with stringent regulations and agreements is to separate the duties of personnel. For example, one group of system administrators may have access to manage operating system patching, database software installation and deployment, backups, and so on, but a separate group (sometimes referred to as application or operations administrators) may be authorized to manage application-specific data and user system access. The inventors have recognized and appreciated that this type of split authorization may be provided using encryption to protect data on the client side and/or at the field-level. According to various aspects, encryption at the field-level enables hosted or on-premises solutions that shield or separate the underlying data for administrative functions of the database. For example, the database host administrators have privileged user access to the hosted database architecture, however, even these administrators are prevented from accessing the underlying data based on the field-level encryption. Such implementation improves over many conventional systems, and in further example, improves security of conventional dynamic schema database systems.

In some embodiments, the operational database and the client layer may be configured to allow the capability for native automatic transparently encrypted queries and query filter data, and native automatic transparently decrypted retrieved records to the application, in which no application query code changes are required. Such automatic transparent encryption and decryption capabilities may be supported in multiple programming language driver software as native driver features, including C, C++, C#, Java, Go, Ruby, Python, Node.js, PHP, and other language drivers.

In some embodiments, the operational database may be configured to allow server-enforced authenticated encryption operations, client-enforced authenticated encryption operations, or both server- and client-enforced field-level authenticated encryption operations. In this way, legacy or non-encryption-aware software attempting to send or store plaintext data into a field that has been designated as encrypted-only may receive a blocking error, thus preventing confidential information from being unintentionally stored in plaintext, through either misconfiguration or some type of administrator or attacker tampering which would otherwise undermine system integrity and record confidentiality.

According to at least one aspect, a database system is provided. The database system may comprise a database comprising a plurality of data storage nodes and may have a dynamic schema. The database system may also include at least one processor configured to, using an encryption process, manage access to plaintext data stored in the plurality of data storage nodes by users employing at least one client-controlled resource in a client access layer; restrict access to the plaintext data by other users, wherein the other users include users with system administration privileges for the database and administrators of processing resources hosting the database; and manage access to encrypted copies of the plaintext data by the users with system administration privileges for the database such that the system administration privileges do not enable access to plaintext versions of the encrypted copies.

In some embodiments, the database may be configured to store the plaintext data within at least one document, and wherein the at least one processor is configured to enable specification of encryption in the client access layer on a minimum of at least one data field within the document.

In some embodiments, the at least one client-controlled resource may manage at least one data key without which the at least one data field cannot be decrypted.

In some embodiments, the at least one processor may be configured to, using the encryption process, restrict access to the at least one data key to users having permission within the client access layer.

In some embodiments, the at least one document is associated with at least the at least one data key.

In some embodiments, the at least one processor may be further configured to receive a request for the at least one data key, and to process the request.

In some embodiments, the at least one processor may be configured to use the encryption process under a zero trust security model.

In some embodiments, the database may follow an eventual consistency model.

In some embodiments, the encryption process may be independent of database access policy.

In some embodiments, the other users may include users with root privileges for the database.

According to at least one aspect, a method is provided for managing data security for a database having a dynamic schema and comprising a plurality of data storage nodes. The method may comprise, using an encryption process, managing access to plaintext data stored in the plurality of data storage nodes by users employing at least one client-controlled resource in a client access layer; restricting access to the plaintext data by other users, wherein the other users include users with system administration privileges for the database and administrators of processing resources hosting the database; and managing access to encrypted copies of the plaintext data by the users with system administration privileges for the database such that the system administration privileges do not enable access to plaintext versions of the encrypted copies.

According to at least one aspect, at least one computer-readable storage medium is provided having instructions recorded thereon which, when executed by a computer, may cause the computer to perform a method for managing data security for a database having a dynamic schema and comprising a plurality of data storage nodes. The method may comprise, using an encryption process, managing access to plaintext data stored in the plurality of data storage nodes by users employing at least one client-controlled resource in a client access layer; restricting access to the plaintext data by other users, wherein the other users include users with system administration privileges for the database and administrators of processing resources hosting the database; and managing access to encrypted copies of the plaintext data by the users with system administration privileges for the database such that the system administration privileges do not enable access to plaintext versions of the encrypted copies.

According to at least one aspect, a database system is provided. The database system may comprise a dynamic schema architecture, a client access layer, and an operational database layer. The client access layer may be configured to manage encryption of plaintext database data at a field-level within an organizational unit of data, and communicate client encrypted data to an operational database layer. The operational database layer may be configured to manage data storage, replication, and retrieval; receive database operations from clients; and return client encrypted data to the client access layer in response to executing the database operations.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of aspects herein. Where technical features in the figures, detailed description, or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure.

In the figures:

FIG. 5C is a flowchart showing an additional example method for managing data security for a database, according to some embodiments.

FIG. 9C is a table relating to example database systems, according to some embodiments.

FIG. 9D is a table relating to example database systems, according to some embodiments.

FIG. 9E is a table relating to example database systems, according to some embodiments.

FIG. 10A is a table relating to example database systems, according to some embodiments.

FIG. 10B is a table relating to example database systems, according to some embodiments.

FIG. 10C is a table relating to example database systems, according to some embodiments.

DETAILED DESCRIPTION

Figure 1:
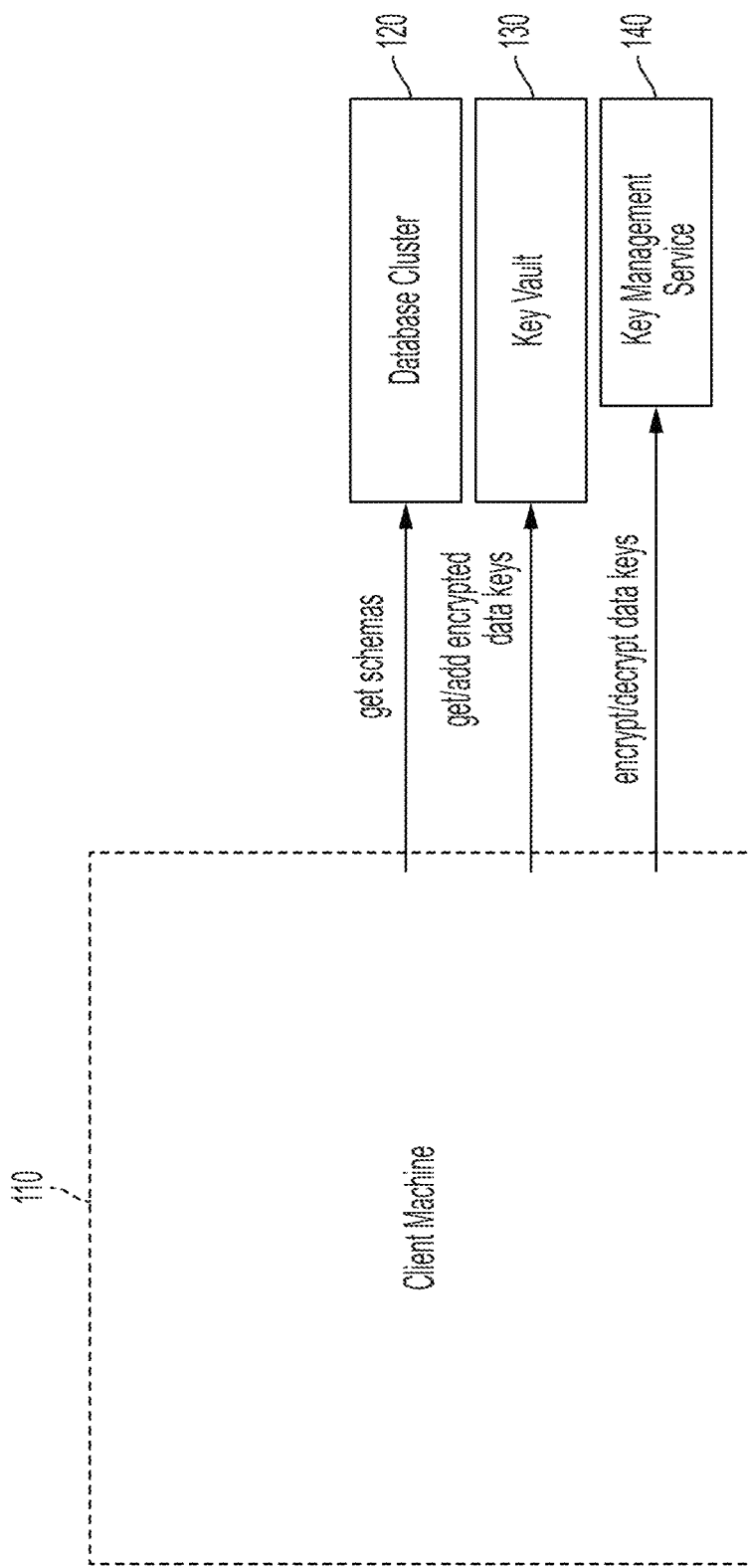
FIG. 1 is a block diagram of an example database system, according to some embodiments.

Many data holders need to improve their data security, in part to comply with regulations and agreements. However, the inventors have recognized and appreciated that conventional database systems generally have important security weaknesses that are not easily fixed. For example, many conventional database systems provide encryption, however, users with administrative privileges have access to the unencrypted data or unencrypted copies thereof based on their role as administrators. This allows access to potentially sensitive data by many individuals in many locations, which may violate security requirements and even lead to data breaches, etc. For example, with hosted or cloud-based database systems, administrators of the hosted resources (e.g., the host provider) can have access to any data. According to various embodiments, the inventors have recognized and appreciated that separating the data plane and control plane for a database system, such that administrative control and customer data are from different areas, may prevent administrators from seeing plaintext data by encrypting extracted data at a layer administrative privileges do not access. The level of data security this provides may be strategically important in meeting strict data standards required by, for example, GDPR, PCI, and HIPAA. Further implementation examples include litigation, forensic imaging, export control, and other situations demanding a zero trust security model.

The inventors have recognized and appreciated that some embodiments of database systems described herein may improve data security by separating duties of database personnel. The architecture of the database can be configured to isolate the administrative duties of the personnel, such that compute/resource administration is sandboxed from application or operational administration.

According to various embodiments, one group of system administrators may have access to manage operating system patching, database software installation and deployment, backups, and so on, with no access to unencrypted data, but a separate group (sometimes referred to as application or operations administrators) may be authorized to manage application-specific data and user system access. The inventors have recognized and appreciated that client-side encryption may prevent sensitive data from being decrypted without access to both the database and a separate key management provider. In examples like this, the application or operations administrators may have access to the separate key management provider, while the first group of system administrators may not.

Another security weakness of many conventional database systems is that they generally encrypt data either not at all or in totality. The inventors have recognized and appreciated that total encryption may be extremely inefficient, requiring far more computing resources when not all data needs to be encrypted (such as user identification numbers), and it can be insecure because a user that can decrypt any of the data can decrypt all of it. Some conventional database systems try to avoid this problem by encrypting data in specific tables, but such databases are relational and not dynamic. The underlying architecture of relational schema systems permits such tailoring of encryption schemes by identifying specific tables. However, where database data is more loosely organized (e.g., dynamic schemas do not require specific data structure, etc.), functionality for targeting tables is ineffective. In some examples, complex queries targeting logical groupings (e.g., collections) can contain or derive references to other documents even in other collections. Thus, an encryption scheme attempting to encrypt based on collections can fail.

Dynamic databases (e.g., a No-SQL database) provide various advantages over relational ones. For example, in contrast to relational databases, databases that employ a dynamic schema may store related data together in a hierarchical structure instead of spreading related data across multiple tables. Further, in dynamic schema architectures data units (e.g., documents) can contain complex data structures (e.g., arrays or nested arrays), and may include references to other data units. Conventionally, operations supported by a database with such dynamic schema are more flexible than their relational or structured counterparts. This flexibility can pose issues in data retrieval and complex operations that require multiple data targets and reconciliation of connections between the data elements.

In various conventional dynamic schema implementations, lower level data encryption is not available owing to the flexibility/complexity of the data structures being encrypted. The inventors have recognized and appreciated that dynamic databases would have greatly improved efficiency and security with encryption at the level of an individual data field and/or with architectures that separate compute/resource administration from application or operation administration, as is provided in some embodiments described herein. The inventors have recognized and appreciated that improved efficiency and security may be provided to dynamic databases using encryption to protect data both from the client side and at the field-level with careful key management practices.

The inventors have recognized and appreciated that client-side field level encryption may further secure sensitive data by preventing access to such data by reading memory of a database host, such as memory dump analysis or scraping of a server's memory (e.g., server RAM).

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Also, the phraseology and terminology used herein is for the purpose of description and should not be regarded as limiting. Any references to examples, embodiments, components, elements, or acts of the systems and methods herein referred to in the singular may also embrace embodiments including a plurality, and any references in plural to any embodiment, component, element, or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 shows an example database system according to some embodiments. In some embodiments, the database system may include a database cluster 120, which may include large filesystems stored across multiple machines. The cluster 120 may include one or more databases, which may employ a dynamic schema and/or follow an eventual consistency model. In some embodiments, the databases may include a plurality of nodes and replicate data from primary node to one or more secondary nodes. In these embodiments, the primary node may handle commands that change the data stored in a database and the secondary nodes may replicate the data in the primary node over time and process read requests. Thereby, the secondary nodes may have data that is not completely up-to-date relative to the primary nodes.

In some embodiments, the database system may also include a client machine 110, which may be on a client's premises or otherwise accessible to the client. As shown in FIG. 1, client machine 110 may interface with database cluster 120, such as to get data, metadata, etc. (e.g., schemas). Additionally, the database system may include at least one key vault 130, which may host data keys (which may also be referred to as encryption keys) that may make decryption of encrypted data in the database possible. Various embodiments encrypt data at a field-level (e.g., data fields within document-organized data) where the encryption keys for the data fields are maintained and accessible only to the client machine and/or users explicitly given permissions by the client machine. For example, keys may be encrypted, preventing unauthorized administrators or infrastructure providers from having access to the keys and as a result full access to data protected by the keys. In some embodiments, encrypted keys may be stored in a key vault collection in the same replica set (described in more detail below) as the encrypted data. In various embodiments, the database architecture passes only encrypted data to system resources (e.g., cloud hosted machines, processors, storage, etc.) outside of the client machine(s). Queries, searches, modifications, etc. are required to retrieve the encrypted version of the database data from such resources so that they can be decrypted at the client machine layer of the architecture.

In some embodiments, the key vault 130 and/or the keys themselves may be protected. For example, the keys in the key vault 130 may themselves be encrypted with a key management service 140. For example, a master key may be used to encrypt keys themselves (such as the keys in a given key vault). In some embodiments, the key vault 130 can be co-located with the database cluster 120, or alternatively it may be in a separate, external cluster.

According to further embodiments, the system or compute resource layer of the architecture (not shown in FIG. 1) can manage its own encryption functions natively, which are processed and resolved to return client encrypted data to the client processes or systems that ultimately can access the plaintext version of the data.

In some embodiments, the database system may include at least one processor configured to, using an encryption process (as discussed in some embodiments below), manage access to plaintext data stored in data storage nodes by users employing at least one client-controlled resource, such as client machine 110, in a client access layer. The processor may also restrict access to the plaintext data by other users, who may include users with system administration privileges for the database and administrators of processing resources hosting the database. In some embodiments, the other users may include users with root privileges for the database.

In some embodiments, the processor may manage access to encrypted copies of the plaintext data by the users with system administration privileges for the database such that the system administration privileges do not enable access to plaintext versions of the encrypted copies. The inventors have recognized and appreciated that these features may provide forms of client-side encryption as discussed herein.

In some embodiments, the database may be configured to store the plaintext data within at least one document. Additionally, the processor may be configured to enable specification of encryption in the client access layer on a minimum of one data field within the document. For example, a single data field may be encrypted independently of all other data fields and may have its own data key, such as having a first data key for a first encrypted data field and a second data key for a second encrypted data field (and there may be other data fields that are not encrypted at all). Alternatively or additionally, certain fields associated with a given user, data type, or other aspect may share a data key. The inventors have recognized and appreciated that these features may provide forms of field-level encryption as discussed herein.

In some embodiments, the encryption process may be independent of database access policy. For example, the encryption process may be integral to the architecture of the database system itself, such as via client-side encryption and/or field-level encryption, rather than reliant on database access policies and groups that have been implemented (some of which the inventor recognized could be defeated, such as a high enough admin changing the policies and allowing the wrong access). In some embodiments, the at least one processor may be configured to use the encryption process under a zero trust security model, which may further enhance data security.

In some embodiments, the client-controlled resource may manage at least one data key without which a given data field cannot be decrypted. Alternatively or additionally, the at least one data key may be managed by the key management service 140. In some embodiments, a document may be associated with a data key. Alternatively, a document may be associated with multiple data keys.

In some embodiments, data key access may be restricted to users having permission within the client access layer. For example, the database system (specifically, the key management service 140) may receive a request for a data key, and may process the request, in some embodiments based on the user's permissions being appropriate. In some embodiments, being within the client access layer may signify being physically located with the client-controlled resources. This may create the security architecture that prevents unauthorized access that might have been possible using only policies, etc. In some embodiments, those without physical access to client-controlled resources may only be able to access encrypted copies of plaintext data.

In some embodiments, the encryption process may use a randomized encryption model, which may make the data not able to be queried. Alternatively or additionally, the encryption process may use a deterministic encryption model, which may allow some data to be queried but may provide weaker data leakage guarantees and resilience to frequency analysis attacks.

Example Database Systems

Figure 2:
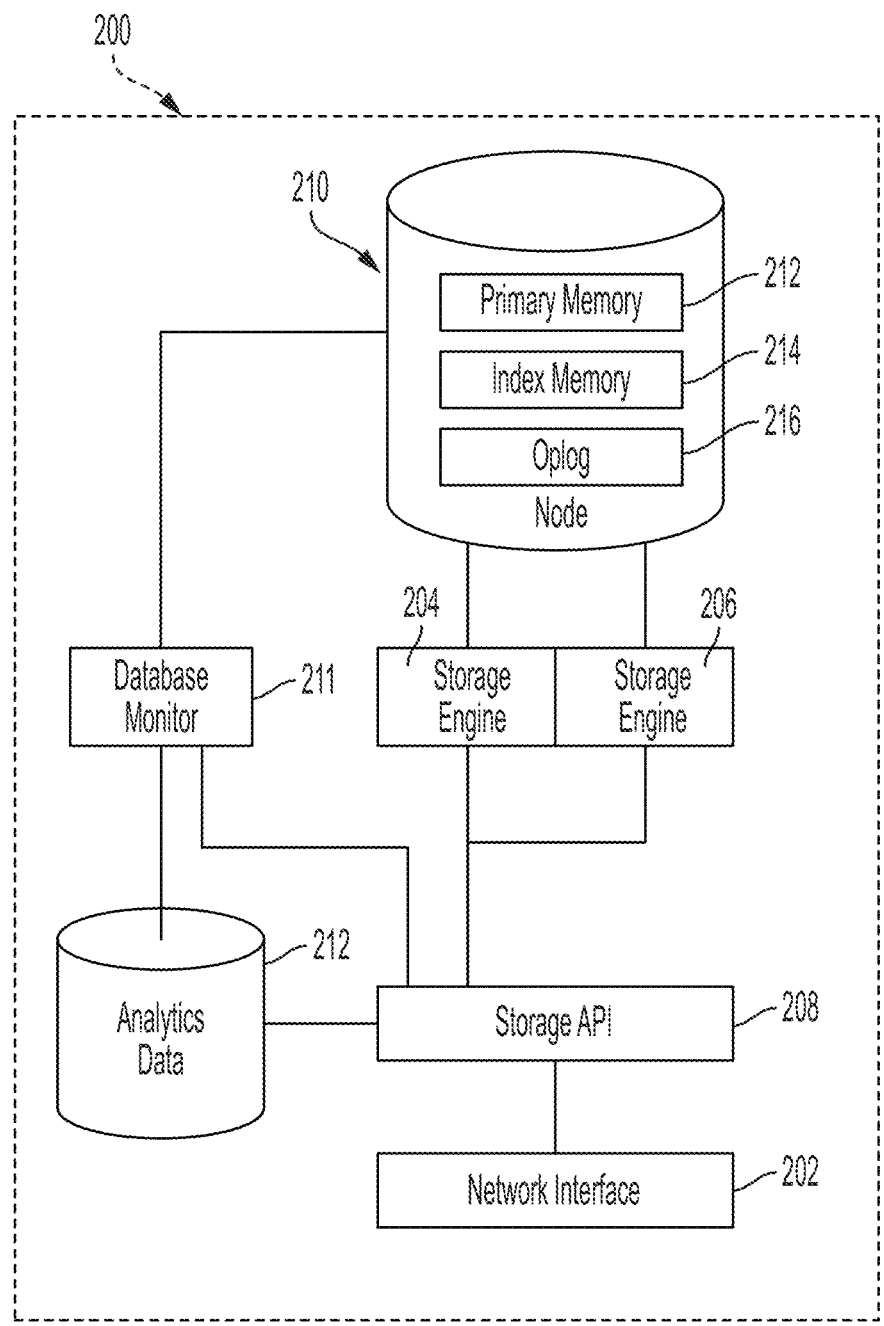
FIG. 2 is a block diagram of an example distributed database system, according to some embodiments.

An example of a database subsystem 200 is shown in FIG. 2. The database subsystem 200 includes an interface 202 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent application Ser. No. 12/977,563, which is hereby incorporated by reference in its entirety. The database subsystem 200 includes a storage application. In one implementation, a base unit of data is a document.

In some embodiments, a storage application programming interface (API) 208 receives database requests, including requests to perform read and write operations. When a write operation is requested, the storage API 208 in response selectively triggers a first storage engine 204 or a second storage engine 206 configured to store data in a first data format or second data format, respectively, in node 210. A database monitor 211 may track a number of analytics about the database. In some embodiments, the database monitor 211 is configured to track the operations performed on the data over time, and stores that information as analytics data 213. In some examples, analytic data may be stored in a separate database. In other examples, the analytics data is stored as a name collection (i.e., a logical grouping of data). These analytics may be provided to the storage API 208, which relies on the analytics to selectively actuate an appropriate storage engine.

In one example, the database monitor 211 tracks the relative number of read and write operations performed on a collection within the database. In another example, the database monitor 211 is configured to track any operations (e.g., reads, writes, etc.) performed on any base unit of data in the database.

In some embodiments, the storage API 208 uses the tracked data (e.g., analytics data) collected by the database monitor 211 and/or the analytics data 213 to select an optimal storage engine for a database, a collection, or a document having the observed read/write ratio. In one example, the storage API 208 is mapped to the selected storage engine. For example, an identifier of the selected storage engine may be stored in a location in memory or on disk; when a write operation request is received by the storage API 208, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 211 itself is configured to determine an optimal storage engine based on the analytics data 213 and other aspects of the data, for example, stored in the database, database collection, or in a document. This determination may be passed to the storage API 208, or otherwise used to map the storage API 208 to a determined storage engine.

The storage API 208 receives database write requests (e.g., from a database API (not shown)) via a network interface 202, and carries out the requested operations by selectively triggering one of the first storage engine 204 and the second storage engine 206. The first storage engine 204 and the second storage engine 206 are executable software modules configured to store database data in the data node 210 in a particular data format. For example, the first storage engine 204 may be configured to store data in a row-store format, and the second storage engine 206 may be configured to store data in a LSM-tree format. In one example, the first storage engine 204 and/or the second storage engine 206 are configured to store primary database data (i.e., the data being stored and queried) in a particular data format in the primary data memory 212, and may store database index data in a particular data format in index data memory 214. In one embodiment, the first storage engine 204 and/or the second storage engine 206 are configured to store an oplog 216 in a particular data format. A database monitor 211 may track a number of analytics about the database, and the operations performed on it over time, and may store that information as analytics data 213.

One advantage of using the storage API 208 as an abstraction layer between the database API and the storage engines is that the identity and selection of a particular storage engine can be transparent to the database API and/or a user interacting with the database API. For example, the database API may pass a "write" function call to the storage API 208 instructing the storage API to write a particular set of data to the database. The storage API 208 then determines, according to its own analysis and/or user input, which storage engine should perform the write operation. Different storage engines may be appropriate for different types of data stored in different collections that may undergo a variety of different operations. Thus, the choice and implementation of calls to an appropriate storage engine are made by the API 208, freeing the database API calls to simply request a "write" of certain data. This abstraction level allows for the implementation of the system on large filesystems that may be stored across machines in a database cluster, such as the Hadoop Filesystem offered by the Apache Software Foundation.

Another advantage of using the storage API 208 is the ability to add, remove, or modify storage engines without modifying the requests being passed to the API 208. The storage API 208 is configured to identify the available storage engines and select the appropriate one based on one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security, and operational tooling across different applications, each powered by different pluggable storage engines.

Figure 3:
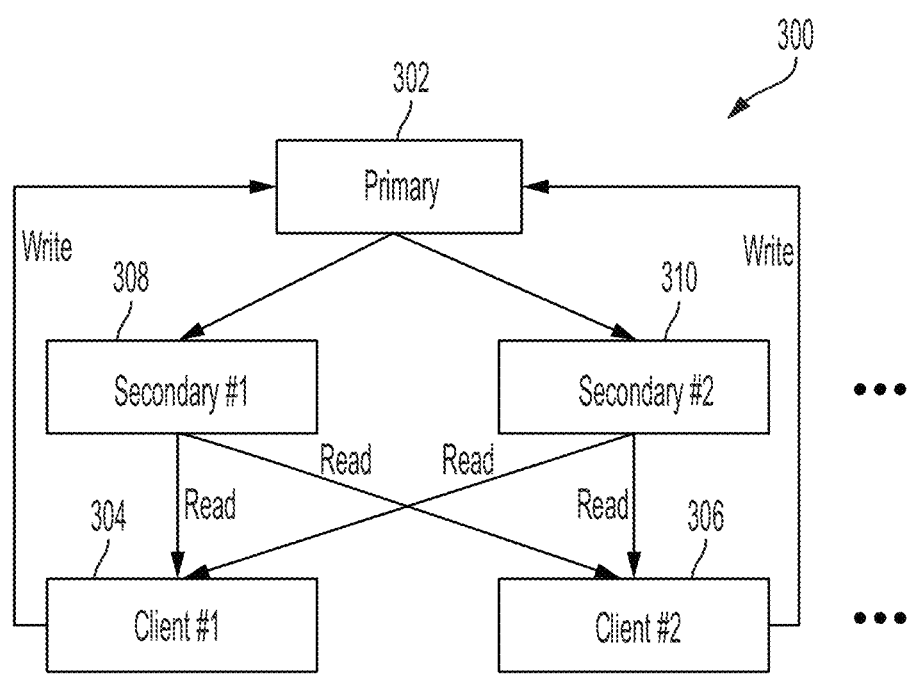
FIG. 3 is a block diagram of an example replica set hosting a distributed database, according to some embodiments.

The embodiment shown and discussed with respect to FIG. 2 depicts a single database node 210. Yet in some embodiments, multiple database nodes may be provided and arranged in a replica set. FIG. 3 shows a block diagram of an exemplary replica set 300. Replica set 300 includes a primary node 302 and one or more secondary nodes 308 and 310, each of which is configured to store a dataset that has been inserted into the database. The primary node 302 may be configured to store all of the documents currently in the database, and may be considered and treated as the authoritative version of the database in the event that any conflicts or discrepancies arise. While two secondary nodes 308, 310 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 302 and secondary nodes 308, 310 may be configured to store data in any number of database formats or data structures as are known in the art. In a preferred embodiment, the primary node 302 is configured to store documents or other structures associated with non-relational databases. The embodiments discussed herein relate to documents of a document-based database, such as those offered by MongoDB, Inc. (of New York, N.Y. and Palo Alto, Calif.), but other data structures and arrangements are within the scope of the disclosure as well.

In some embodiments, the replica set primary node 302 only accepts write requests (disallowing read requests) from client systems 304, 306 and the secondary nodes 308, 310 only accept reads requests (disallowing write requests) from client systems 304, 306. In such embodiments, the primary node 302 receives and processes write requests against the database, and replicates the operation/transaction asynchronously throughout the system to the secondary nodes 308, 310. In one example, the primary node 302 receives and performs client write operations and generates an oplog. Each logged operation is replicated to, and carried out by, each of the secondary nodes 308, 310, thereby bringing those secondary nodes into synchronization with the primary node 302. In some embodiments, the secondary nodes 308, 310 may query the primary node 302 to receive the operation log and identify operations that need to be replicated. In other embodiments, the operation log may be transmitted from the primary node 302 to the secondary nodes 308, 310 periodically or in response to the occurrence of a predefined condition, such as accruing a threshold number of operations in the operation log that have not yet been sent to the secondary nodes 308, 310. Other implementations can be configured to provide different levels of consistency, by restricting read requests. For example, read requests can be restricted to systems having up to date data, read requests can also in some settings be restricted to primary systems, among other options.

In some embodiments, both read and write operations may be permitted at any node (including primary node 302 or secondary nodes 308, 310) in response to requests from clients. The scalability of read operations can be achieved by adding nodes and database instances. In some embodiments, the primary node 302 and/or the secondary nodes 308, 310 are configured to respond to read operation requests by either performing the read operation at that node or by delegating the read request operation to another node (e.g., a particular secondary node 308). Such delegation may be performed based on load-balancing and traffic direction techniques known in the art.

In some embodiments, the primary node 302 and the secondary nodes 308, 310 may operate together to form a replica set 300 that achieves eventual consistency, meaning that replication of database changes to the secondary nodes 308, 310 may occur asynchronously. When write operations cease, all replica nodes of a database will eventually "converge," or become consistent. The eventually consistent model provides for a loose form of consistency. In one particular example, (assuming >3 secondary systems) client systems (e.g. 304, 306) request write operations: W(x=3); W(x=7); W(x=5). As the replication of the write requests occurs asynchronously, at some point all of the secondary systems (e.g. 308, 310) will respond to a read request with 5. However, in the short term (during replication operations) client systems randomly reading from secondaries can see [read operations designated by R (variable and actual value)]: R(x=7); R(x=0); R(x=5); and R(x=3). In such a configuration, replica set 300 provides eventual consistency and can permit out of order reads (in the short term). Other example implementations can increase the strength of consistency, and for example, can include monotonic read consistency (no out of order reads). Eventual consistency may be a desirable feature where high availability is important, such that locking records while an update is stored and propagated is not an option. In such embodiments, the secondary nodes 308, 310 may handle the bulk of the read operations made on the replica set 300, whereas the primary node 308, 310 handles the write operations. For read operations where a high level of accuracy is important (such as the operations involved in creating a secondary node), read operations may be performed against the primary node 302. In some embodiments, replica set 300 can be configured to perform according to a single writer eventually consistent model.

It will be appreciated that the difference between the primary node 302 and the one or more secondary nodes 308, 310 in a given replica set may be largely the designation itself and the resulting behavior of the node; the data, functionality, and configuration associated with the nodes may be largely identical, or capable of being identical. Thus, when one or more nodes within a replica set 300 fail or otherwise become available for read or write operations, other nodes may change roles to address the failure. For example, if the primary node 302 were to fail, a secondary node 308 may assume the responsibilities of the primary node, allowing operation of the replica set to continue through the outage. This failover functionality is described in U.S. application Ser. No. 12/977,563, the disclosure of which is hereby incorporated by reference in its entirety.

Each node in the replica set 300 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area, and/or private networks. Various communication architectures are contemplated for the sets of servers that host database instances and can include distributed computing architectures, peer networks, and virtual systems, among other options.

The primary node 302 may be connected by a LAN, a WAN, or other connection to one or more of the secondary nodes 308, 310, which in turn may be connected to one or more other secondary nodes in the replica set 300. Connections between secondary nodes 308, 310 may allow the different secondary nodes to communicate with each other, for example, in the event that the primary node 302 fails or becomes unavailable and a secondary node must assume the role of the primary node.

Figure 4:
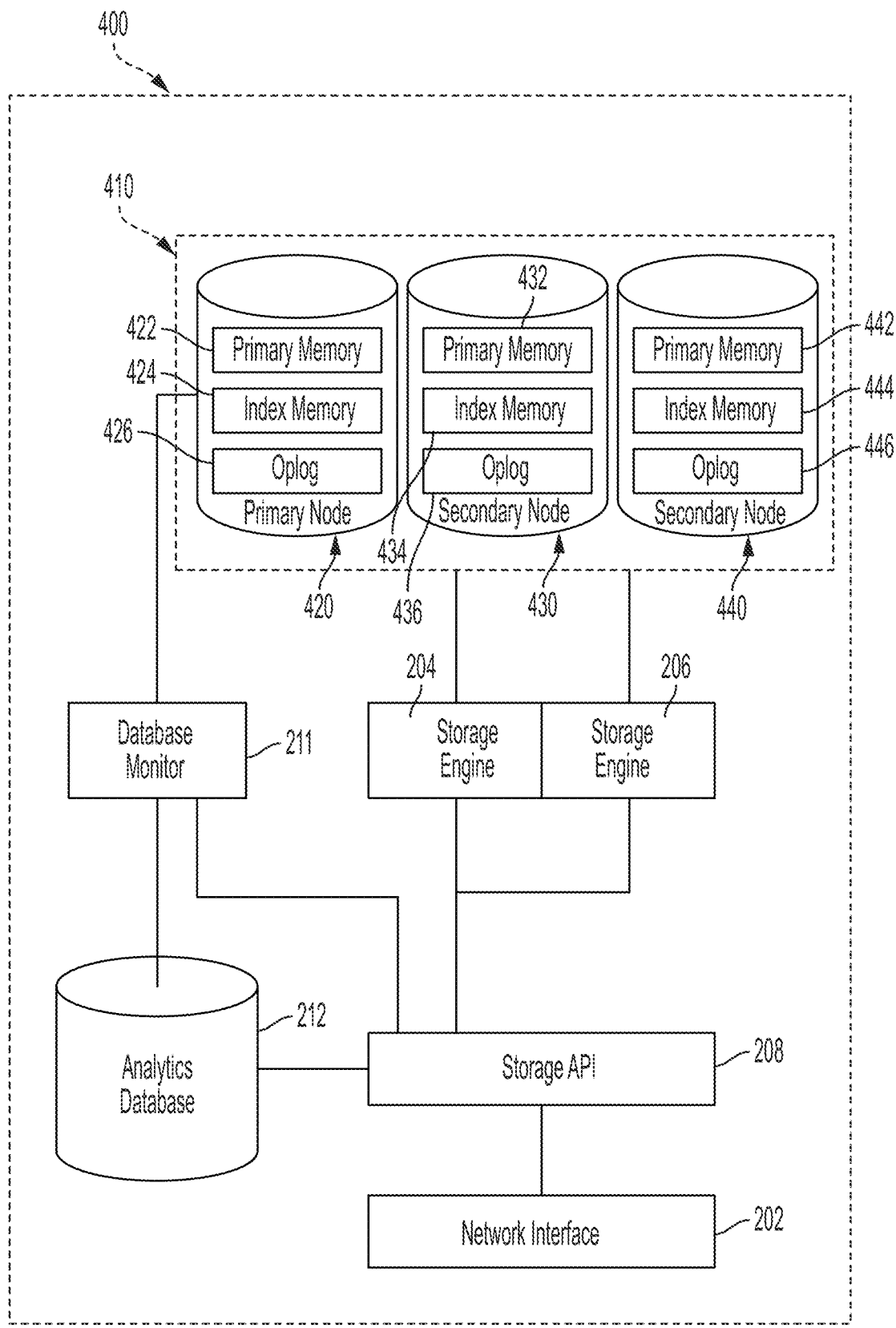
FIG. 4 is a block diagram of an example distributed database system, according to some embodiments.

An example of a database subsystem 400 incorporating a replica set 410 is shown in FIG. 4. As can be seen, database subsystem 400 incorporates many of the elements of database subsystem 200 of FIG. 2 including the network interface 202, the storage engines 204, 206, the storage API 208, the database monitor 211, and the analytics database 212. Relative to the database subsystem 200 shown in FIG. 2, the database subsystem 400 replaces the single node 210 with a replica set 410 comprising primary node 420 and secondary nodes 430 and 440. In one example, the replica set 410 functions in much the same manner as the replica set 300 discussed with respect to FIG. 3. While only two secondary nodes 430 and 440 are shown for illustrative purposes, it will be appreciated that the number of secondary nodes may be scaled up or down as desired or necessary.

In one example, database operation requests directed to the replica set 410 may be processed by the primary node 420 and either performed by the primary node 420 or directed to a secondary node 430, 440 as appropriate. In one embodiment, both read and write operations are permitted at any node (including primary node 420 or secondary nodes 430, 440) in response to requests from clients. The scalability of read operations can be achieved by adding nodes and database instances. In some embodiments, the primary node 420 and/or the secondary nodes 430, 440 are configured to respond to read operation requests by either performing the read operation at that node or by delegating the read request operation to another node (e.g., a particular secondary node 430). Such delegation may be performed based on load-balancing and traffic direction techniques known in the art.

In some embodiments, the database only allows write operations to be performed at the primary node 420, with the secondary nodes 430, 440 disallowing write operations. In such embodiments, the primary node 420 receives and processes write requests against the database, and replicates the operation/transaction asynchronously throughout the system to the secondary nodes 430, 440. In one example, the primary node 420 receives and performs client write operations and generates an oplog. Each logged operation is replicated to, and carried out by, each of the secondary nodes 430, 440, thereby bringing those secondary nodes into synchronization with the primary node 420 under an eventual-consistency model.

In one example, primary database data (i.e., the data being stored and queried) may be stored by one or more data storage engines in one or more data formats in the primary data memory 422, 432, 442 of nodes 420, 430, 440, respectively. Database index data may be stored by one or more data storage engines in one or more data formats in the index data memory 424, 434, 444 of nodes 420, 430, 440, respectively. Oplog data may be stored by a data storage engine in a data format in oplog data memory 426 of nodes 420.

Example Methods for Managing Data Security for a Database

Figure 5A:
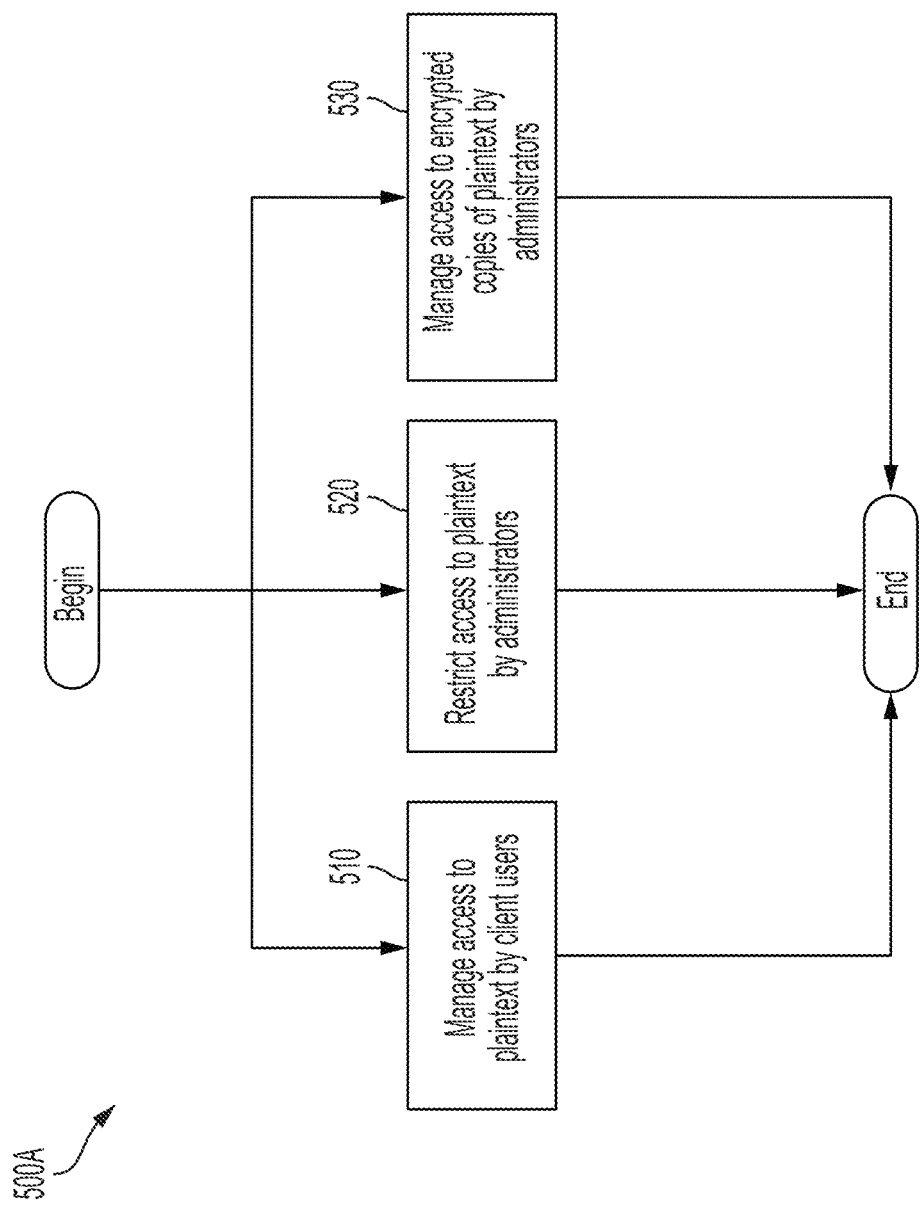
FIG. 5A is a flowchart showing an example method for managing data security for a database, according to some embodiments.

As discussed above, various systems may be configured to manage data security for a database having a plurality of data notes. FIG. 5A shows an example process 500A according to some embodiments. Process 500A may be performed by a system (e.g., that shown in FIG. 1) to manage data security for a database, such as a database employing a dynamic schema and/or an eventual consistency model. In some embodiments, process 500A may include an act 510 of, using an encryption process, managing access to plaintext data stored in the plurality of data storage nodes by users employing at least one client-controlled resource in a client access layer that may be performed by, for example, a processor.

In some embodiments, process 500A may further include an act 520 of restricting access to the plaintext data by other users that may be performed by a processor, which may be the same as or separate and distinct from the first processor. In some embodiments, the other users may include users with system administration privileges for the database and administrators of processing resources hosting the database.

In some embodiments, process 500A may further include an act 530 of managing access to encrypted copies of the plaintext data by the users with system administration privileges for the database such that the system administration privileges do not enable access to plaintext versions of the encrypted copies. Process 500A may then end or repeat as necessary.

In some embodiments, the acts 510, 520, and/or 530 may be performed by a client device and/or a server. Dividing the process 500A between multiple devices may advantageously reduce the total amount of time required to perform the process 500A by reducing the communication between the client device and the server.

Figure 5B:
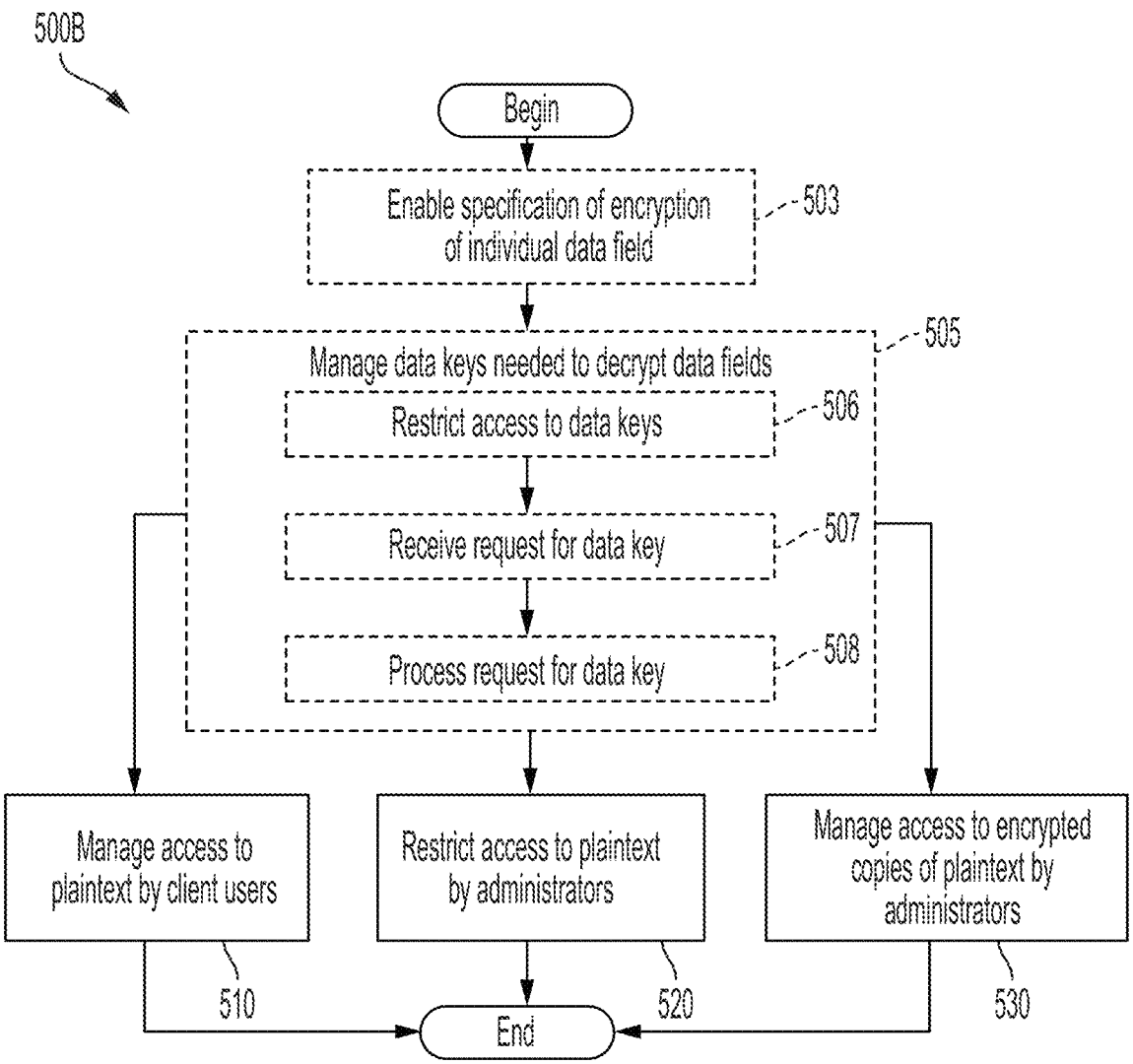
FIG. 5B is a flowchart showing an additional example method for managing data security for a database, according to some embodiments.

FIG. 5B shows an example process 500B according to some embodiments. Process 500B may be performed by a system (e.g., that shown in FIG. 1) to manage data security for a database, such as a database employing a dynamic schema and/or an eventual consistency model. In some embodiments, process 500B may optionally include an act 503 of enabling specification of encryption of an individual data field. For example, a client application may read an automatic encryption configuration (e.g., a JSON schema as discussed below). Alternatively or additionally, process 500B may optionally include validating a query with an automatic encryption configuration (e.g., a JSON schema as discussed below). In some embodiments, process 500B may optionally include validating encryption commands (e.g., using mongocryptd as discussed below). Process 500B may then optionally proceed to an act 505 of managing data keys needed to decrypt data fields. In some embodiments, act 505 may optionally include an act 506 of restricting access to data keys, which may be the default state in order to secure data keys.

Process 500B may then optionally proceed to an act 507 of receiving a request for a data key, which may be processed in act 508 and may be based on permissions of the requesting user. For example, the requested data key(s) may be fetched from a key vault collection. Subsequently, in some embodiments, a KMS (key management system) provider may use a master key it stores to remotely decrypt the requested data key(s). In some embodiments, process 500B may then proceed to an act 510, similar to that described above.

In some embodiments, act 510 may include selectively encrypting fields in a document with the requested data key(s) and writing the field-level-encrypted document to a database data collection. Alternatively or additionally, act 510 may include selectively decrypting fields in a document with the requested data key(s) and reading the document. In some embodiments, process 500B may further include an act 520 similar to that described above. In some embodiments, process 500B may further include an act 530 similar to that described above. Process 500B may then end or repeat as necessary.

FIG. 5C shows an example process 500C according to some embodiments. Process 500C may be performed by a system (e.g., that shown in FIG. 1) to manage data security for a database, such as a database employing a dynamic schema and/or an eventual consistency model. In some embodiments, process 500C may optionally include an act 505, similar to that described above. Process 500C may then proceed to an act 509 of receiving a request for a data field, such as to get or update the data field. Process 500C may then proceed to an act 511 of determining whether the request includes a data key for the requested data field. If a yes is determined in act 511, process 500C may optionally proceed to an act 512 of determining whether the requesting user has permissions to access plaintext data in the requested data field. If a yes is determined in act 512, process 500C may optionally proceed to an act 513 of providing access to the plaintext data in the requested data field, which may include transmitting the plaintext data from the database cluster (e.g., cluster 120 in FIG. 1) to a client machine (e.g., client machine 110 in FIG. 1). Process 500C may then end or repeat as necessary. If a no is determined in act 512, process 500C may end or repeat as necessary.

If a no is determined in act 511, process 500C may proceed to an act 521 of restricting access to plaintext data, such as for the user requesting the given data field without the corresponding data key. Process 500C may then optionally proceed to an act 522 of determining whether the requesting user has permissions to access encrypted copies of the requested data field, such as a database administrator. If a yes is determined in act 522, process 500C may optionally proceed to an act 531 of providing access to encrypted copies of plaintext data to the requesting user as described herein. Process 500C may then end or repeat as necessary. Alternatively, if a no is determined in act 522, process 500C may end or repeat as necessary.

Example Special-Purpose Computer System

Figure 6:
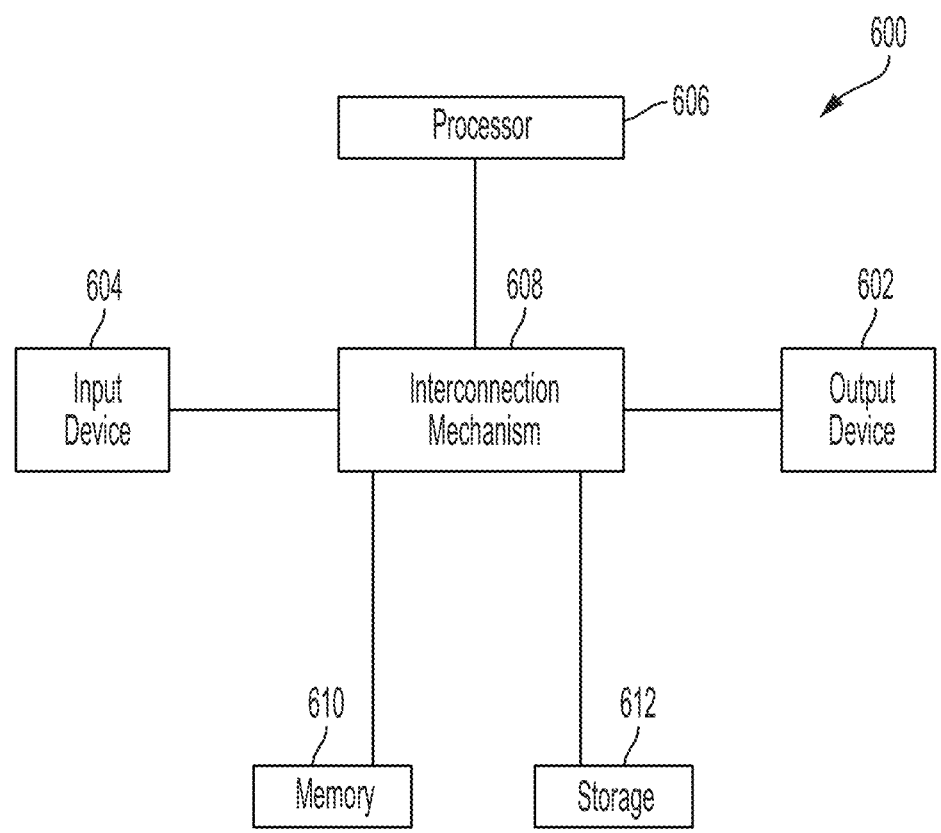
FIG. 6 is a block diagram of an example special-purpose computer system, according to some embodiments.

A special-purpose computer system can be specially configured as disclosed herein. According to one embodiment, the special-purpose computer system is configured to perform any of the described operations and/or algorithms. The operations and/or algorithms described herein can also be encoded as software executing on hardware that defines a processing component, that can define portions of a special purpose computer, reside on an individual special-purpose computer, and/or reside on multiple special-purpose computers. FIG. 6 shows a block diagram of an example special-purpose computer system 600 on which various aspects herein can be practiced. For example, computer system 600 may include a processor 606 connected to one or more memory devices 610, such as a disk drive, memory, or other device for storing data. Memory 610 is typically used for storing programs and data during operation of the computer system 600. Components of computer system 600 can be coupled by an interconnection mechanism 608, which may include one or more busses (e.g., between components that are integrated within a same machine) and/or a network (e.g., between components that reside on separate discrete machines). The interconnection mechanism enables communications (e.g., data, instructions) to be exchanged between system components of system 600.

Computer system 600 may also include one or more input/output (I/O) devices 602-904, for example, a keyboard, mouse, trackball, microphone, touch screen, a printing device, display screen, speaker, etc. Storage 612 typically includes a computer readable and writeable nonvolatile recording medium in which computer executable instructions are stored that define a program to be executed by the processor or information stored on or in the medium to be processed by the program.

Figure 7:
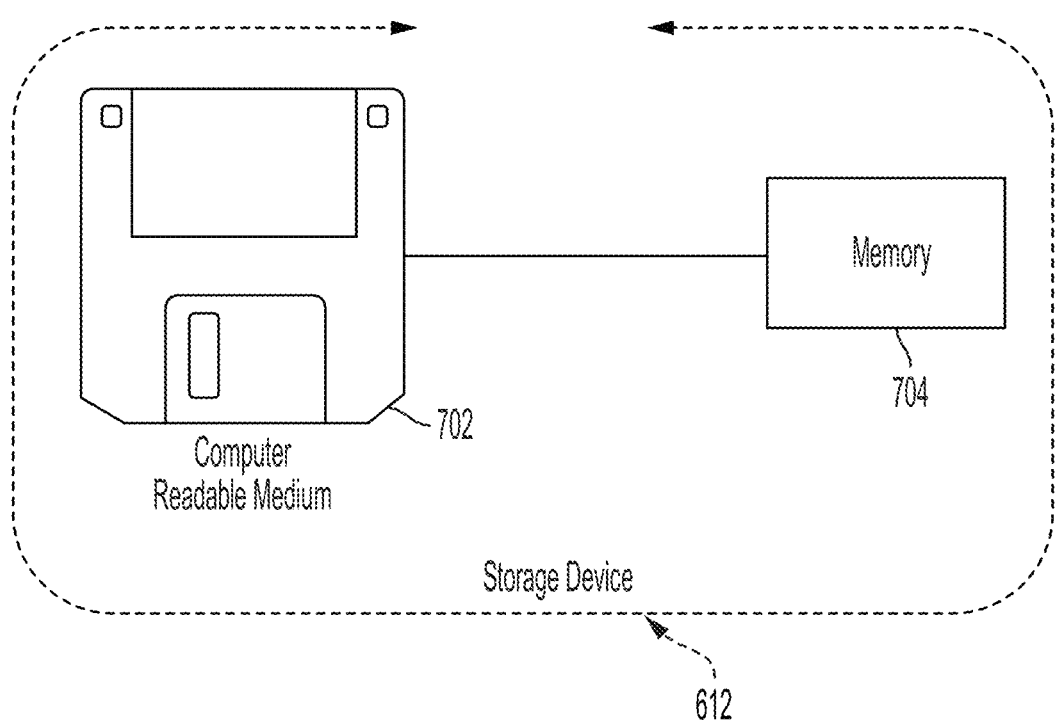
FIG. 7 is a block diagram of an example disk or flash memory, according to some embodiments.

The medium can, for example, be a disk 702 or flash memory as shown in FIG. 7. Typically, in operation, the processor causes data to be read from the nonvolatile recording medium into another memory 704 that allows for faster access to the information by the processor than does the medium. This memory is typically a volatile, random access memory such as a dynamic random access memory (DRAM) or static memory (SRAM). According to one embodiment, the computer-readable medium comprises a non-transient storage medium on which computer executable instructions are retained.

Referring again to FIG. 6, the memory can be located in storage 612 as shown, or in memory system 610. The processor 606 generally manipulates the data within the memory 610, and then copies the data to the medium associated with storage 612 after processing is completed. A variety of mechanisms are known for managing data movement between the medium and integrated circuit memory element and aspects herein are not limited thereto. Aspects herein are not limited to a particular memory system or storage system.

Figure 8:
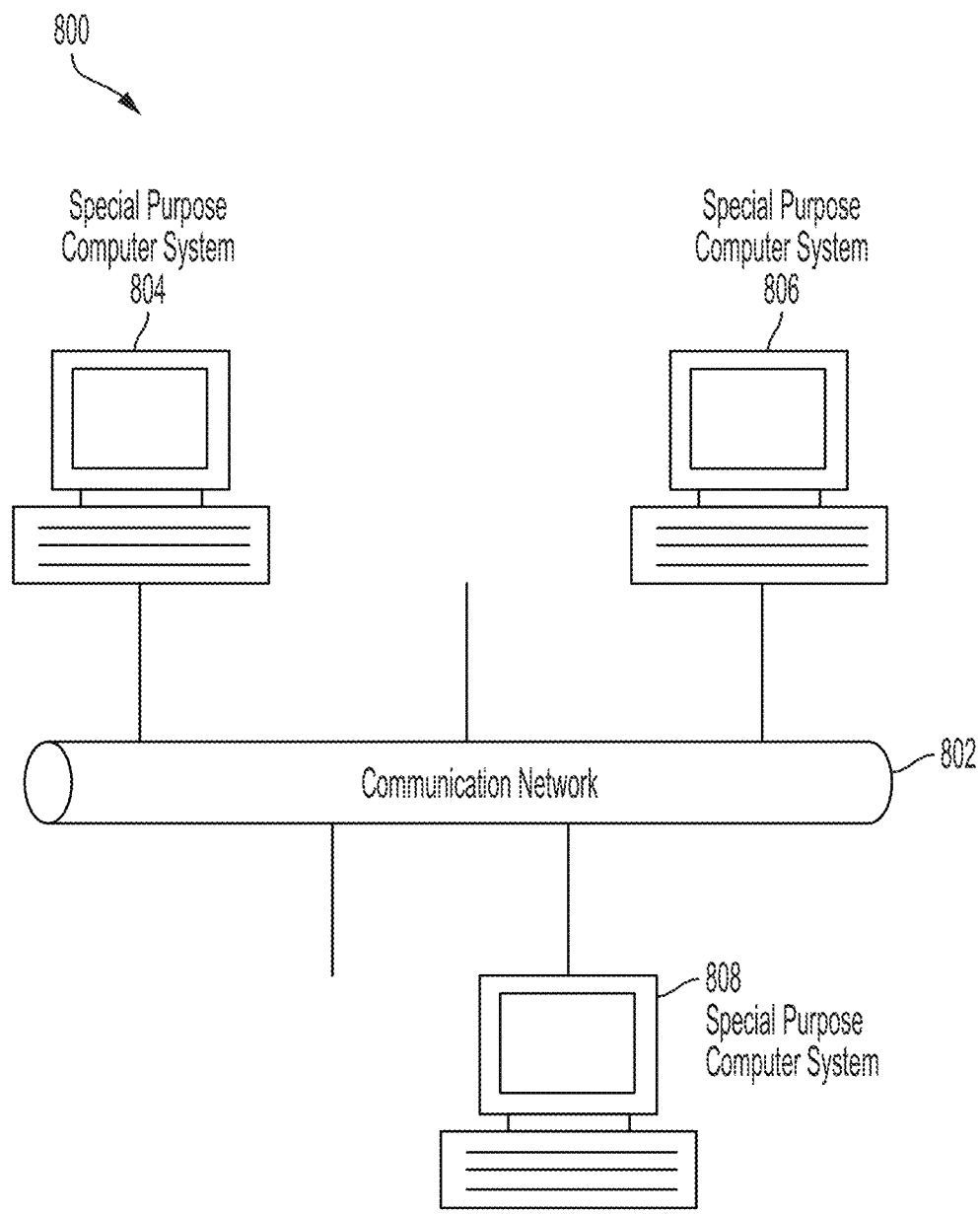
FIG. 8 is a block diagram of an example distributed system, according to some embodiments.

The computer system may include specially-programmed, special-purpose hardware, for example, an application-specific integrated circuit (ASIC). Aspects herein can be implemented in software, hardware or firmware, or any combination thereof. Although computer system 800 is shown by way of example, as one type of computer system upon which various aspects herein can be practiced, it should be appreciated that aspects herein are not limited to being implemented on the computer system as shown in FIG. 8. Various aspects herein can be practiced on one or more computers having different architectures or components than that shown in FIG. 8.

It should be appreciated that aspects herein are not limited to executing on any particular system or group of systems. Also, it should be appreciated that aspects herein are not limited to any particular distributed architecture, network, or communication protocol.

Various embodiments herein can be programmed using an object-oriented programming language, such as Java, C++, Ada, or C# (C-Sharp). Other programming languages may also be used. Alternatively, functional, scripting, and/or logical programming languages can be used. Various aspects herein can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects herein can be implemented as programmed or non-programmed elements, or any combination thereof.

Various aspects herein can be implemented by one or more systems similar to system 800 shown in FIG. 8. For instance, the system can be a distributed system (e.g., client server, multi-tier system) that includes multiple special-purpose computer systems. In one example, the system includes software processes executing on a system associated with hosting database services, processing operations received from client computer systems, interfacing with APIs, receiving and processing client database requests, routing database requests, routing targeted database request, routing global database requests, determining global a request is necessary, determining a targeted request is possible, verifying database operations, managing data distribution, replicating database data, migrating database data, etc. These systems can also permit client systems to request database operations transparently, with various routing processes handling and processing requests for data as a single interface, where the routing processes can manage data retrieval from database partitions, merge responses, and return results as appropriate to the client, among other operations.

There can be other computer systems that perform functions such as hosting replicas of database data, with each server hosting database partitions implemented as a replica set, among other functions. These systems can be distributed among a communication system such as the Internet. One such distributed network, as discussed below with respect to FIG. 8, can be used to implement various aspects herein. Various replication protocols can be implemented, and in some embodiments, different replication protocols can be implemented, with the data stored in the database replication under one model, e.g., asynchronous replication of a replica set, with metadata servers controlling updating and replication of database metadata under a stricter consistency model, e.g., requiring two phase commit operations for updates.

FIG. 8 shows an architecture diagram of an example distributed system 800 suitable for implementing various aspects herein. It should be appreciated that FIG. 8 is used for illustration purposes only, and that other architectures can be used to facilitate one or more aspects herein.

System 800 may include one or more specially configured special-purpose computer systems 804, 806, and 808 distributed among a network 802 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

Implementation Examples

Below are described implementation examples and additional techniques that may be employed in any combination with the techniques described herein.
Exemplary Scope of Some Embodiments of Client-Side Field Level Encryption:

In some embodiments, field-level encryption with a client-side-only encrypt/decrypt option may be employed. The inventors have recognized and appreciated that some embodiments may provide additional confidentiality and role-based access technical control options for sensitive workloads. For example, per-field encryption may enable market feature parity by offering the following encryption modes with varying security/functional trade-offs: randomized (most secure/least functional; no searching/indexing); and deterministic (weaker security; point searches, simple indexes).

In some embodiments, deterministic encryption may be defined as follows: Equal values have the same encrypted value. AES may be employed in CBC (possibly as an AEAD scheme) or GCM mode, with a fixed initialization vector. Deterministic encryption may be the least secure mode and vulnerable to frequency analysis. Deterministic encryption may allow point searches on encrypted fields.

In some embodiments, randomized encryption may be defined as follows: Equal values have different encrypted values. Randomized encryption may be the most secure but least functional encryption mode. AES may be employed in CBC (possibly as an AEAD scheme) or GCM mode, with a random initialization vector. Randomized encryption may prevent any queries on encrypted fields.

Some embodiments should not prevent hooks for future pluggable Searchable Symmetric Encryption (SSE) (strong security; point searches, range searches, Bloom filter indexes). Some embodiments may support the GDPR "right-to-be-forgotten" clause. In some embodiments, user data can be made unrecoverable by deleting the associated encryption key.

In some embodiments, Searchable Symmetric Encryption (SSE) may be defined as follows: Equal values have different encrypted values, but can make use of secure structures such as inverted indexes and search trees. SSE may provide strong security with the most function, with limited information leakage. Primitives may include AES-CTR, AES-CMAC, and encrypted Bloom filters. SSE may allow point & range searches, disjunctive, conjunctive and arbitrary boolean keyword search on encrypted fields.

Some embodiments may enable client-side encryption, which may offer users the ability to store encrypted field data in a way that the database operator cannot recover plaintext, even with DBA or root access, without access to the client's keys. Some embodiments may ensure that clients can know which fields must be encrypted, the mode of encryption, and associated field keys. Some embodiments may encrypt and decrypt specific fields in a document with client-supplied keys.

Some embodiments may provide drivers with a mechanism to request keys (e.g., drivers are key management-unaware).

Some embodiments may designate one or more fields at the collection level as encrypted. In some embodiments, key(s) could be used across multiple collections, based on application criteria. The inventors have recognized and appreciated that this may allow one or more keys per collection. The inventors have recognized and appreciated that this may alternatively or additionally allow one or more keys per document by embedding a key ID within each encrypted value. For example, the same field across two documents could have two different keys (one association per document).

Some embodiments may provide flexibility to optionally provide key address resolution for more schemes.

Some embodiments may provide clearly opinionated encryption algorithm options, with modern, well-characterized, well-studied constructions.

Some embodiments may offer two security modes for configuration/discovery and enforcement of FLE: a default strong security mode with client-side-only FLE configuration and enforcement for applications that cannot rely on server-side information as more than advisory; or an optional server-side discovery and enforcement mode for metadata encrypted field state/configuration to schema-unaware clients (e.g., Compass, other integrated or distributed client drivers) for encrypted data operations (find/insert/update with sensitive information in filter), such as through JSON Schema. For example, JSON Schema metadata can configure in server what fields are encrypted and encryption key path. Some embodiments may provide an ability for collection-level metadata to express BSON data types of the unencrypted value stored in encrypted fields (Date, Boolean, Long, String, etc.).

Some embodiments may require as little change as possible to application code. The inventors have recognized and appreciated that this may allow automatic decryption on encrypted field query results wherever possible. The inventors have recognized and appreciated that this may alternatively or additionally allow automatic encryption on encrypted fields wherever possible (e.g., support simple match expressions with first level fields).

Some embodiments may query features that need to be supported, at least as an option, depending on an encryption mode selected.

Some embodiments may have a performance impact of less than 20% on equality semantics (e.g., encrypted versus non-encrypted).

Some embodiments may provide key rotation. For example, some embodiments may support deterministic key rotation (such as at a master envelope key for a field). Alternatively or additionally, some embodiments may support randomized key rotation. Some embodiments may support N keys in drivers, such as via a master field key (see, e.g., SQL Server AE engine key rotation mechanics).

Some embodiments may provide explicit helper functions/methods in drivers that specify encrypted fields will remain community-oriented.

Some embodiments may provide auto-encrypt functionality that may be enterprise-only. In some embodiments, other work may be all-community-oriented.

Some embodiments may provide drivers that support AWS KMS. For example, internal drivers API may mimic a subset of the most common KM IP methods.

In some embodiments, server builds may have support for storing, deleting, and updating encrypted keys encrypted by AWS KMS CMK.

Some embodiments may provide minimal cloud support in, for example, Data Explorer.

Some embodiments may provide Compass support.

Some embodiments may support, via driver(s), local KMS for customer trial of FLE and development purposes, for example.

Some embodiments may provide classification of data. For example, applications could do this via separate keys for different fields within a document (such as one key encrypting SSN, name, and address; another encrypting billing data; a third key encrypting medical diagnosis code).

Some embodiments may provide whole document encryption or embedded sub-document encryption (e.g., encrypting an entire BSON Object).

Some embodiments may provide native database key management.

Some embodiments may provide tokenization.

Some embodiments may provide cryptographic agility (e.g., limiting encryption modes to a few strong, modern versioned choices).

Some embodiments may provide plaintext data masking.

Some embodiments may provide Order-Preserving Encryption. For example, cipher text may not be sortable in some embodiments but may be sortable in certain embodiments.

Some embodiments may provide FIPS 140-2 support. The inventors have recognized and appreciated that this may require a single client side implementation (rather than a separate implementation in every driver), especially if the implementation has to be validated.

Some embodiments may provide an ability to encrypt or obfuscate field names. For example, if any identifier used to retrieve a key includes derived/concatenated content (e.g., email address plus SSN), the application may be responsible for managing trust and potential information leaks with the key server.

Some embodiments may provide a tool to re-key (re-encrypt) data.

Some embodiments may provide stitch support.

Some embodiments may provide Database Charts support.

Some embodiments may provide BIC SaaS/On-Premise support.

Some embodiments may provide support for retrieving AWS credentials automatically (e.g., from EC2 instance profile AssumeRole or generating temporary security tokens). Some embodiments may support an explicitly set access key ID and secret access key.

Some embodiments may support encrypting entire arrays or individual elements within an array.

Some embodiments may support aggregations involving foreign namespaces ($lookup, SgraphLookup, $out).

Some embodiments may support for querying views on collections with encrypted fields.

Some embodiments may support equality/comparisons of encrypted fields to null.

Exemplary Driver Specification for Client-Side Encryption:

Various terms may be defined as below according to some embodiments.

libmongocrypt: A library, written in C, that coordinates communication, does encryption/decryption, caches key and schemas.

mongocrvptd: A local process the driver communicates with to determine how to encrypt values in a command.

Customer Master Key (CMK): The underlying key AWS KMS uses to encrypt and decrypt.

KMS Key Management Service: An HTTP service providing encryption/decryption using a CMK. Data keys are encrypted and decrypted with KMS.

MongoDB key vault: A special collection containing encrypted data keys. This can either be co-located with the data-bearing cluster, or in a separate external MongoDB cluster.

data key: A key used for encryption and decryption of BSON messages. Data keys themselves are encrypted with a key management service and stored in the MongoDB key store.

ciphertext: One of the data formats of BSON binary subtype 6, representing an encoded BSON document containing encrypted ciphertext and metadata.

intent-to-encrypt marking: One of the data formats of BSON binary subtype 6, representing an encoded BSON document containing plaintext and metadata.

schema: A valid JSONSchema (either supplied by the server or client-side) which may include metadata about encrypted fields.

Exemplary User Facing API:

In some embodiments, drivers may not preclude other options from being added to any of the new interfaces.

In some embodiments, drivers may represent the options types in a way that is idiomatic to the driver or language. For example, options may include a BSON document or dictionary type. In some embodiments, the driver may forego validating options and instead defer validation to the underlying implementation.

In some embodiments, drivers may deviate the spelling of option names to conform to their language's naming conventions.

For example:

```
aws_creds = {
    "access_key_id": os.environ["AWS_ACCESS_KEY_ID"],
    "secret_access_key" : os.environ["AWS_SECRET_ACCESS_KEY"]
}
auto_encrypt_map = {
    "db.coll": { "enabled" : True }
}
client=MongoClient(kms_providers={ "aws":aws_creds},auto_encrypt_map=auto_encrypt_map)
# Operations on db.coll are auto-encrypted and decrypted.
client.db.coll.insert_one({"ssn": "567-89-0000"})
print(coll.find_one( )) # { "ssn": "567-89-0000" }
# But stored as ciphertext.
coll_no_decrypt = client.testdb.get_collection("coll", auto_encrypt={enabled: "false"}) print(coll_no_decrypt.find_one( )) # { "ssn": BinData(...) }
keyvault = KeyVault(client, {"aws": aws_creds})
# Use a KeyVault to create new data keys.
aws_cmk={provider:"aws",key:os.environ["AWS_CMK"],region:os.environ["AWS_REGION"] }
created_key = keyvault.create_data_key("aws", master_key=aws_cmk)
# Use a KeyVault to explicitly encrypt and decrypt.
encrypted = keyvault.encrypt("secret text",
key_id=created_key["insertedId"],
algorithm="AEAD_AES_256_CBC_HMAC_SHA_512-Randomized")
decrypted = keyvault.decrypt(encrypted)
Exemplary MongoClient Changes:
class MongoClient {
        MongoClient (... encryptionOpts: ClientSideEncryptionOpts);
}
class ClientSideEncryptionOpts {
        keyVaultClient: Optional<MongoClient>;
        keyVaultNamespace: Optional<String>; // Defaults to"admin.datakeys"
        kmsProviders: Map<String, Map<String, Value>>;
        autoEncryptMap: Map<String, AutoEncryptOpts>;
        extraOptions: Optional<Map<String, Value>>;
}
class AutoEncryptOpts {
        enabled: Optional<Boolean>; // Defaults to true.
        schema: Optional<Document>;
}
```

In some embodiments, the key vault collection contains all data keys used for encryption and decryption. In some embodiments, data keys may be stored as documents in a special MongoDB collection (default "admin.datakeys"). In some embodiments, data keys may be protected with encryption by a KMS provider (AWS KMS or a local master key). In some embodiments, the key vault collection may be assumed to reside on the same MongoDB cluster as indicated by the connecting URI. In some embodiments, an optional keyVaultClient can be used to indicate a separate MongoDB cluster.

In some embodiments, multiple KMS providers may be specified. Initially, two KMS providers may be supported in some embodiments: "aws" and "local". The kmsProviders map values may differ by provider:

```
aws: {
    accessKeyId: String,
    secretAccessKey: String,
    endpoint: Optional<String> // An optional alternate API endpoint.
}
local: {
    key: byte[64] // The master key used to encrypt/decrypt data keys.
}
```

In some embodiments, a MongoCollection can be configured to automatically encrypt commands and decrypt results. Drivers may document that collection auto-encryption/decryption is an enterprise-only feature in some embodiments. In some embodiments, the autoEncryptMap may enable auto-encryption/decryption on collections—for example, {"db.coll": AutoEncryptOpts( . . . )}. In some embodiments, this can be overriden at the collection level. The "schema" value of AutoEncryptOpts specifies a local JSONSchema in some embodiments. If omitted, schemas may be periodically polled with the listCollections command in some embodiments. In some embodiments, drivers may document that a local schema is more secure. This may protect against a malicious server advertising a false JSONSchema to trick the client into sending unencrypted data that should be encrypted.

```
{
    // Defaults to "mongodb://%2Fvar %2Fmongocryptd.sock" if domain sockets
    are available or
    // "mongodb://localhost:27020" otherwise.
    mongocryptdURI: Optional<String>,
    // If omitted, assume the user has spawned mongocryptd.
    mongocryptdPath: Optional<String>,
    // Passed upon spawning mongocryptd. Drivers MUST error if
    mongocryptdPath is omitted.
    mongocryptdSpawnArgs: Optional<Array[String]>
}
```

In some embodiments, drivers may anticipate that some options (e.g., options in ClientSideEncryptionOpts.extraOptions) may be deprecated in some releases.

Exemplary Key Vault:

```
class KeyVault {
    KeyVault (keyVaultClient: MongoClient,
        kmsProviders:Map<String,Map<String,Object>>,
        keyVaultNamespace: Optional<Stning>);
    createDataKey(kmsProvider: String, opts: Optional<DataKeyOpts>):
    InsertOneResult; encrypt(value: BSONValue, opts: EncryptOpts):
    Binary;
    decrypt(value: Binary): BSONValue;
}
```

```
class DataKeyOpts {
    keyAltName: Optional<BSONValue> // An alternative to _id to
    reference a
    key.
    masterKey: Object
}
class EncryptOpts {
    keyId : Optional<Binary> // Identifies a key vault document by
    the UUID
    '_id'. keyAltName: Optional<BSONValue> // Identifies a key
    vault document
    by 'keyAltName'.
    algorithm: String // "AEAD_AES_256_CBC_HMAC_SHA_512-
    Deterministic" or
            // "AEAD_AES_256_CBC_HMAC_SHA_512-
    Randomized" initializationVector: Optional<byte[16]> // Only
    applicable for
    Deterministic encryption.
}
```

In some embodiments, the DataKeyOpts.masterKey object values differ by provider ("aws" and "local").

```
{
    provider: "aws",
    region: String,
    key: String // The Amazon Resource Name (ARN) to the AWS
    customer
    master key (CMK).
}
{
    provider: "local"
}
```

Exemplary MongoDatabase.getCollection Changes:
database.getCollection( . . . auto_encrypt: Optional<AutoEncryptOpts>);

In some embodiments, these options may override any set on the parent MongoClient.

Exemplary User Facing API: When Auto-Encryption Fails:

In Some Embodiments, Auto-Encryption on the Client Side Requires Parsing the MongoDB query language client side. In ambiguous cases, or operations that cannot be parsed, the driver throws an exception to prevent the possibility of the client sending unencrypted data that should be encrypted.

For example, the driver cannot know if arguments should be encrypted in operations that depend on other collections in some embodiments. For example, any aggregate with $lookup fails:

```
accounts = db.get_collection("accounts"j auto_encrypt={"enabled":
False})
results = accounts.aggregate([
    {
        "$lookup": {
            "from": "people",
            "pipeline": [
                {
                    "$match": {
                        "ssn": "567-89-0000"
                    }
                }
            ],
            "as": "person"
        }
    }
]) # Driver does not know the schema for "people", throws an exception
print (next(results)["person"]["ssn"])
```

In such cases, the user may use explicit encryption on a collection not configured with auto-encryption.

```
accounts = db.accounts
results = accounts.aggregate([
{
        "$lookup": {
        "from":"people",
        "pipeline": [
                {
                        "$match": {
                                "ssn": keyvault.encrypt("567-89-0000",
                                        encrypt_opts)
                        }
                }
        ],
        "as": "person"
        }
    }
])
print (keyvault.decrypt(next(results)["person"]["ssn"]))
```

Exemplary User Facing API: Exemplary View Limitations:

In some embodiments, users cannot use auto-encryption with views; attempting to do so results in an exception. In some embodiments, drivers do not need to validate when the user is attempting to enable auto-encryption on a view, but may defer to the underlying implementation. Although auto-encryption may not work on views, users may still use explicit encrypt and decrypt functions on views in some embodiments.

Figure 9A:
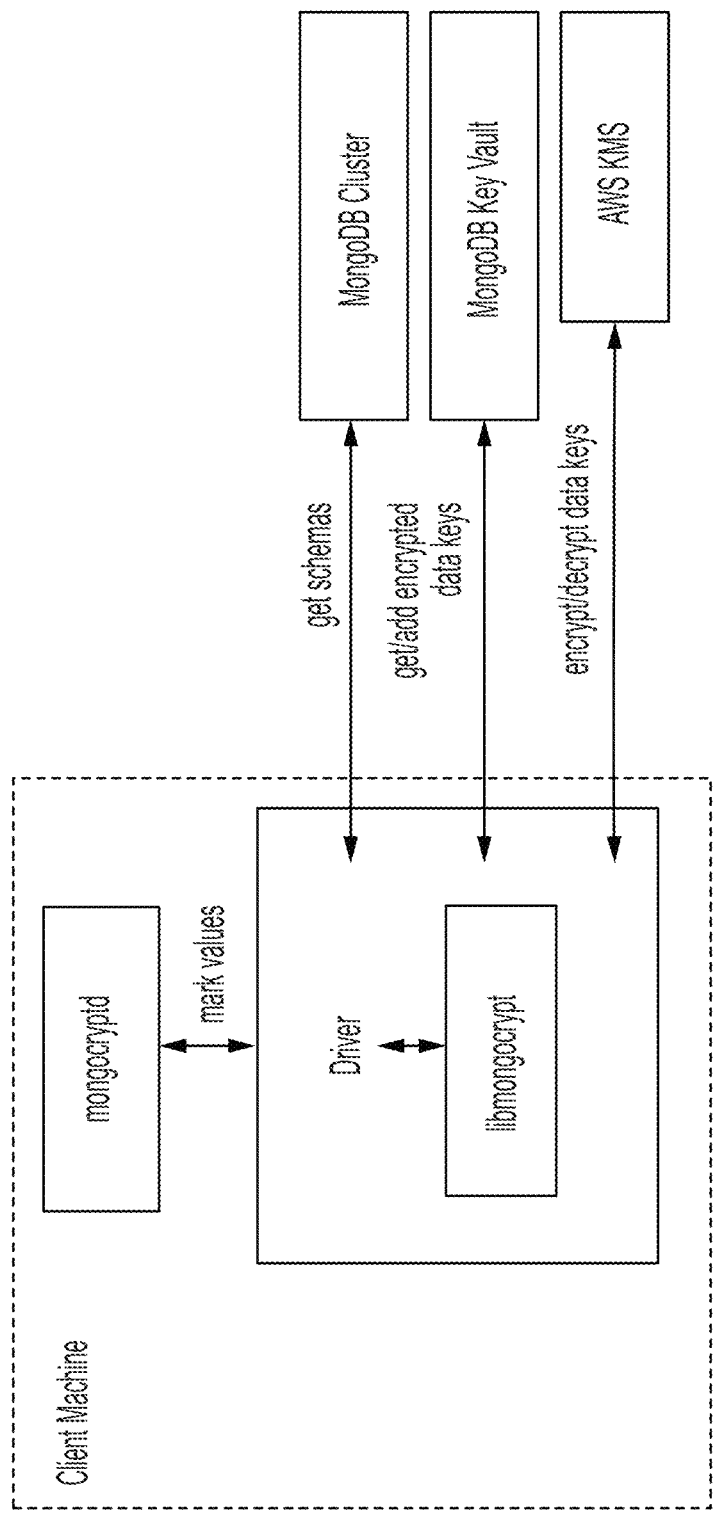
FIG. 9A is a block diagram of an example database system, according to some embodiments.

Exemplary Driver: Exemplary Implementation:

In some embodiments, the driver interacts with multiple components to implement client side encryption, such as is shown in FIG. 9A.

In some embodiments, the driver communicates with: MongoDB cluster to get remote JSONSchemas; MongoDB key vault to get encrypted data keys and create new data keys; AWS KMS to decrypt fetched data keys and encrypt new data keys; mongocryptd to ask what values in BSON commands must be encrypted.

Exemplary MongoDB Key Vault Collection:

In some embodiments, the key vault collection is a special MongoDB collection containing key documents.

To provide a separation of concerns, key material in the key vault is encrypted with a separate KMS service in some embodiments. Therefore, encryption and decryption requires access to a MongoDB cluster and the KMS service in some embodiments.

In some embodiments, the key vault collection may live in a different MongoDB cluster from the primary data bearing cluster.

Exemplary AWS KMS:

In some embodiments, AWS KMS is used to decrypt data keys after fetching from the MongoDB Key Vault, and encrypt newly created data keys.

In some embodiments, drivers may take a best-effort when interacting with KMS since responses may include decrypted data key material (e.g., use secure malloc if available).

mongocryptd: In some embodiments, mongocryptd is a singleton local process needed for collection auto-encryption. It may be partially managed by the driver in some embodiments. The driver may spawn mongocryptd if necessary, but mongocryptd is responsible for self-termination.

libmongocrypt: In some embodiments, the driver may integrate with the library libmongocrypt. libmongocrypt provides crypto helpers and coordinates the driver communication with external components. In some embodiments, libmongocrypt may be responsible for: orchestrating an internal state machine; asking the driver to perform I/O, then handling the responses, including constructing KMS HTTP requests and parsing KMS responses; doing encryption and decryption; caching data keys; caching results of listCollections; creating key material.

In some embodiments, the driver may be responsible for performing all I/O needed at every state—for example, speaking to mongocryptd to mark commands, fetching encrypted data keys from key vault (mongod), running listCollections on mongod, or decrypting encrypted data keys with KMS over TLS. In some embodiments, the driver is responsible for doing I/O asynchronously as needed. In some embodiments, even synchronous drivers may fan out KMS requests because encrypting one command may require decrypting multiple keys and KMS has no batch API.

In some embodiments, libmongocrypt exposes a simple state machine to perform operations.

Exemplary Driver: Exemplary KeyVault( ):

In some embodiments, the new KeyVault type contains shared state for encryption and decryption (MongoClient to mongocryptd, handle to libmongocrypt), provides an interface to explicitly encrypt, decrypt, and create data keys, and is used to enable auto-encryption/decryption in a MongoCollection.

Integrating with Libmongocrypt:

In some embodiments, each KeyVault instance may have one handle to libmongocrypt.

In some embodiments, libmongocrypt exposes logging capabilities. In some embodiments, drivers may enable this logging and integrate with their existing logging mechanisms if possible. For example, if your driver exposes a logging callback that a user can set, it may be possible to get log messages from libmongocrypt.

In some embodiments, drivers may propagate errors from libmongocrypt in whatever way is idiomatic to the driver (exception, error object, etc.).

Example of Managing mongocryptd:

If the KeyVault is configured with extraOptions. mongocryptd Path, then mongocryptd may be spawned by the driver. Spawning may include the command line argument --idleShutdownTimeoutSecs. If the user does not supply one through extraOptions.mongocryptdSpawnArgs, then the driver may append --idleShutdownTimeoutSecs=60 to the arguments. This tells mongocryptd to automatically terminate after 60 seconds of non-use.

If spawning is necessary, the driver spawns the first time it needs to use mongocryptd. And if server selection ever fails, then the driver may retry spawning mongocryptd and connecting once. If it fails to connect on retry, the server selection error is propagated to the user.

If the KeyVault is configured without extraOptions.mongocryptdPath, then the driver is not responsible for spawning mongocryptd. If server selection ever fails when connecting to mongocryptd, the server selection error is propagated to the user.

Upon construction, the KeyVault may create a MongoClient to mongocryptd configured with serverSelectionTimeoutMS=1000.

Exemplary Driver: Exemplary KeyVault Methods:

In some embodiments, the driver may use libmongocrypt to implement KeyVault.createDataKey( ), KeyVault.encrypt( ), and KeyVault.decrypt( ).

In some embodiments, for KeyVault.createDataKey( ) the resulting document may be inserted into the key vault collection with write concern majority.

Exemplary Driver: Collection Auto-Encrypt and Decrypt:

A MongoCollection can be configured to automatically encrypt commands and decrypt results:

coll=db.get_collection("coll", auto_encrypt=opts)

db.coll.insert({name: "Todd", ssn: "567-89-0000"})

In some embodiments, the driver transparently encrypts the value "567-89-0000" in the find command before sending it to the server.

In some embodiments, results are automatically decrypted. Though SSN is stored as a ciphertext on the server, the driver may decrypt it automatically in the results:

result=db.coll.find_one({name: "Todd" })

print(result["ssn"]) # prints 567-89-0000

In some embodiments, the driver may use libmongocrypt to perform auto-encryption and decryption.

Exemplary Command Whitelist:

In some embodiments, collections with auto-encryption enabled automatically encrypt and decrypt on a subset of commands run through the collection object. There is a whitelist of supported commands in some embodiments. In some embodiments, the driver may throw when attempting to auto-encrypt unsupported commands.

In some embodiments, drivers may attempt to auto-encrypt the following commands: aggregate (collection); count distinct; delete; find; findAndModify; insert; update; explain. In some embodiments, drivers may attempt to auto-decrypt the results of the above commands, and auto-decrypt the results of a getMore on any cursor derived from the results of the above commands.

In some embodiments, drivers may throw an exception for any other commands indicating that auto-encryption is not supported for that command.

In some embodiments, drivers may raise an error when attempting to auto-encrypt a command if the maxWireVersion is less than 8.

Exemplary Interaction with Command Monitoring:

In some embodiments, unencrypted data may not appear in the data of any command monitoring events. Encryption may occur before generating a CommandStartedEvent, and decryption may occur after generating a CommandSucceededEvent in some embodiments.

Exemplary Size Limits and Wire Protocol Considerations:

Because encryption increases the size of commands, the driver may instead use the following reduced size limits when constructing commands for encryption in some embodiments: maxBsonObjectSize=1 MiB; maxMessageSizeBytes=1 MiB.

In some embodiments, the driver may send an OP_MSG document sequence to mongocryptd, though there may be little benefit since maxMessageSizeBytes is no larger than maxBsonObjectSize.

In some embodiments, the final encrypted command returned by libmongocrypt is returned as a BSON document that could be passed to a run command helper. Therefore, it is subject to the maxBsonObjectSize limit.

Figure 9B:
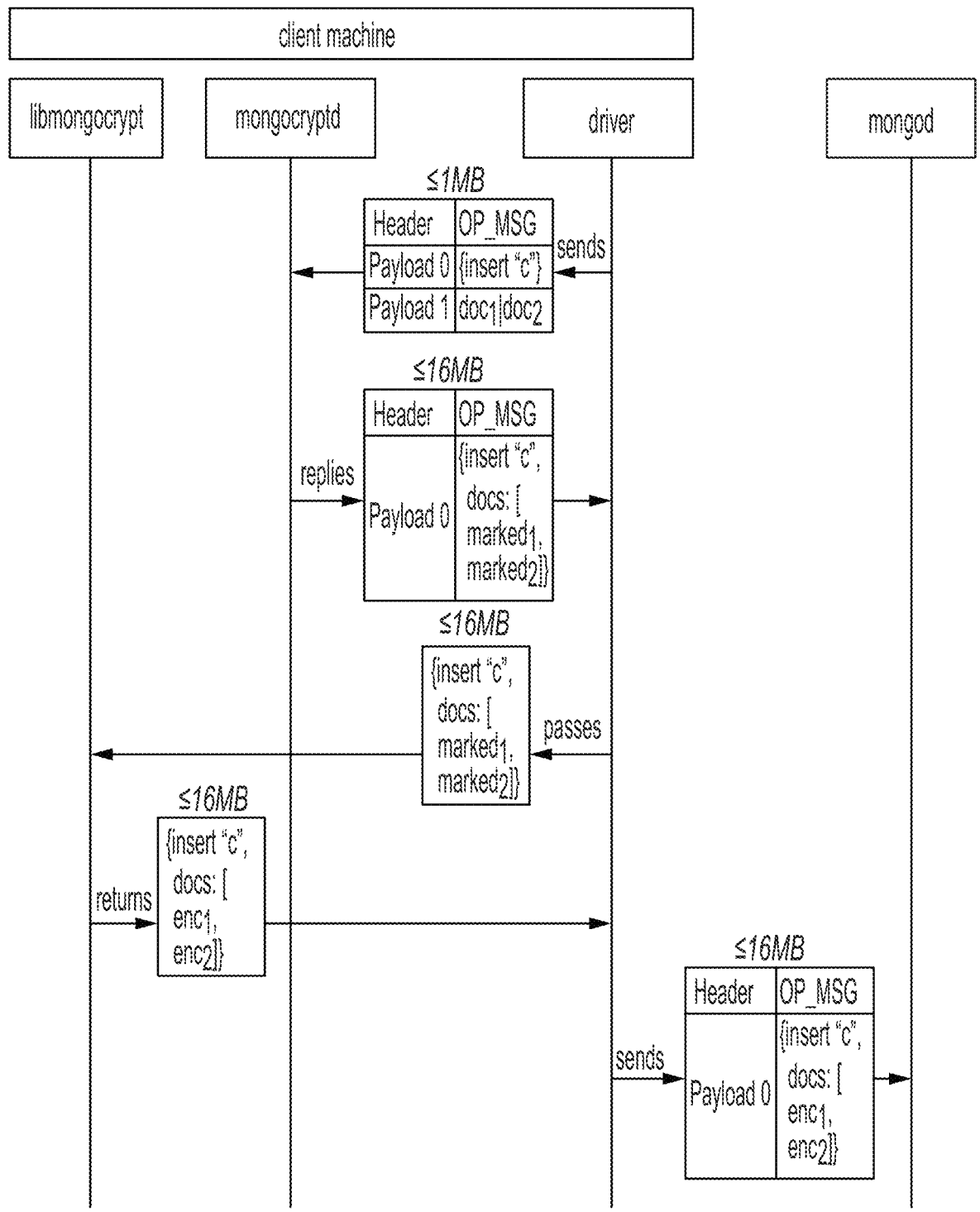
FIG. 9B is a process diagram of an example database system, according to some embodiments.

To clarify, FIG. 9B shows the sequence of communication between components in the case where the driver uses an OP_MSG document sequence to communicate with mongocryptd in some embodiments. Throughout, the maximum message size is bounded by the 16 MB limit in some embodiments.

Exemplary Key Vault Keys:

In some embodiments, data keys are stored in the MongoDB key vault with the schema shown in FIG. 9C. In some embodiments, masterKey contents may be as shown in FIG. 9D.

In some embodiments, data keys are needed for encryption and decryption; they may be identified in the intent-to-encrypt marking and ciphertext. In some embodiments, data keys may be retrieved by querying the "_id" with a UUID or by querying the "keyAltName" with a BSON value.

Exemplary BSON Binary Subtype 6:

In some embodiments, BSON Binary Subtype 6 may have a one-byte leading identifier. The following is a quick reference according to some embodiments:

```
struct fle_blob {
    uint8 fle_blob subtype;
    [more data - see individual type definitions]
}
Type 0: Intent-to-encrypt marking
struct fle_blob {
    uint8 fle_blob subtype = 0;
    [ bson ];
}
Types 1 and 2: Ciphertext
struct fle_blob {
    uint8 fle_blob subtype = (1 or 2);
    uint8 key_uuid[16];
    uint8 original_bson_type;
    uint32 ciphertext_length;
    uint8 ciphertext[ciphertext_length];
}
```

Exemplary JSONSchema "encrypt":

The following is an example:

encrypt: { bsonType: "int"

```
    algorithm:"AEAD_AES_256_CBC_HMAC_SHA_512TBD-Deterministic"
    initializationVector: 0x1234
    keyId: [UUID(...)]
}
```

Each field is briefly described as shown in FIG. 9E.

Libmongocrypt: Exemplary Prohibitions and Warnings:

In some embodiments, libmongocrypt may validate options. In some embodiments, the following noteworthy cases may be prohibited in some embodiments: Explicit encryption using the deterministic algorithm on an array or document. In some embodiments, the following cases may warn: A local schema that does not include encrypted fields.

libmongocrypt: Exemplary Collection Info Caching:

In some embodiments, libmongocrypt may cache the collection infos so encryption with remote schemas need not run listCollections every time. Collection infos (or lack thereof) may be cached for one minute. In some embodiments, this may not be configurable. After expiration, subsequent attempts to encrypt may result in libmongocrypt requesting a new collection info.

In some embodiments, remote schemas may be given to libmongocrypt as results of a listCollections cursor, libmongocrypt is given a document like the following:

```
{
    "name" : "coll",
    "type" : "collection",
    "options" : {
        "validator" : {
            "$jsonSchema" : { /* JSONSchema with encrypted fields */ }
        }
    }
}
```

If $jsonSchema has encrypted fields (determined after the NEED_SCHEMA_CHECKED state), then libmongocrypt may validate that the "validator" document has no siblings (i.e., it only has a $jsonSchema field) in some embodiments. For example, the following is an invalid remote schema validator:

```
{
    "name" : "coll",
    "type" : "collection",
    "options" : {
        "validator" : {
            "$jsonSchema" : { /* JSONSchema with encrypted fields */ },
            "a": { $gt: 1 }
        }
    }
}
```

In some embodiments, if the response to isEncryptedNeeded indicated the $jsonSchema has encrypted fields, but the validator has siblings, then the libmongocrypt may enter the ERROR state.

libmongocrypt: Exemplary Data Key Caching:

In some embodiments, data keys are cached in libmongocrypt for one minute. This is not configurable in some embodiments, and there is no maximum number of keys in the cache.

In some embodiments, the BSON document returned by the driver is parsed into a C struct and cached. In some embodiments, the data key material may be stored securely. In some embodiments, this may not be paged to disk and the memory is properly zero'd out after freeing.

In some embodiments, the cache is protected with a read/write lock.

When libmongocrypt requests keys from the driver, the cache is first consulted as follows in some embodiments: 1. A read lock is taken. 2. The cache is searched for data keys with an _id matching a UUID or with a keyAltName matching a BSON value. 3. The keyMaterial and status is copied for each matched key. 4. Any unmatched UUIDs/strings are noted. 5. Expired entries are noted. 6. If there are expired or unmatched keys, a write lock is taken, and "pending" entries are placed in the cache for those keys. 7. All locks are unlocked. In some embodiments, a list of find command filters for the keys not found cache may be returned to the driver. In some embodiments, the driver fetches them from the key vault(s).

In some embodiments, the subsequent call to the next encrypt/decrypt step includes any missing keys (if there were any). If there are any expired entries and/or there were new keys fetched, libmongocrypt may take a write lock on the cache. While holding the lock, it may update entries with responses and delete expired entries.

Libmongocrypt: Exemplary Crypto Implementation:

In some embodiments, libmongocrypt uses AEAD_SHA256_CBC_HMAC512 for both "randomized" and "deterministic" encryption algorithms. For "randomized", libmongocrypt securely creates a random IV. For "deterministic" the schema may include a fixed IV.

In some embodiments, decrypting with a disabled (status=0) key is allowed and does not result in error. Attempting to encrypt with a disabled key results in an error.

APM Events for Encryption or Key Service Interaction:

APM events include the encrypted data before it is sent to the server, or before it is decrypted in a reply. Therefore, app developers can determine whether or not encryption occurred by inspecting the values in their command monitoring events. However, some embodiments may offer separate "encryption" and "decryption" events, as well as interactions with the key service.

Remove Mongocryptd:

Some embodiments may remove the mongocryptd process and fold the logic into libmongocrypt. Therefore, drivers may use libmongocrypt to abstract encryption logic, deduplicate work, and provide a simpler path to removing mongocryptd.

Support External Key Vaults Discovery:

In some embodiments, the only way to configure an external key vault may be by passing a MongoClient. For apps like Compass, where it may not be possible for users to configure this app side, there should ideally be enough information in the database to decrypt data (excluding KMS credentials, which are still passed as MongoClient options). It may be desirable to store a URI to the external key vault somewhere in the data bearing cluster, so clients can connect to the external key vault without additional user supplied configuration in some embodiments.

Batch listCollections Requests on Expired Schema Cache Entries:

In some embodiments, libmongocrypt may refresh schemas one at a time.

In some embodiments, a maximum size for the JSON-Schema/key cache may be employed. Alternatively, there may be no such maximum.

Recalculate Message Size Bounds Dynamically:

In some embodiments, instead of using one reduced maxMessageSizeBytes, libmongocrypt could hide the complexity of properly resplitting bulk writes after encryption. In some embodiments, i a simple back-off algorithm may be used: try marking a command with maxMessageSizeBytes=24 MB. If after marking this is determined to be too large, another attempt may be made with maxMessageSizeBytes=12 MB, and so on. In the end, libmongocrypt would create multiple OP_MSGs to send in some embodiments.

Exemplary Scope: FLE and Authenticated Encryption with Associated Data (AEAD):

MongoDB FLE may use, in some embodiments, AEAD_AES_256_CBC_HMAC_SHA512.

In some embodiments, an encrypted field in MongoDB may contain the following payload, except ciphertext_length may be removed:

```
struct fle_blob {
    uint8 fle_blob subtype = (1 or 2);
    uint8 key_uuid[16];
    uint8 original_bson_type;
    uint8 ciphertext[ciphertext_length];
}
```

FIGS. 10A-B show exemplary names and descriptions for formats, algorithms, and so on in some embodiments.

In some embodiments, the CipherText (C) may be computed as follows. When used in deterministic mode, IV is hard coded instead of random in some embodiments. This weakens the security guarantees in exchange for supporting equality comparisons against encrypted values.

Algorithm Parameters:
ENC=AES-256
MAC=SHA-512
ENC_KEY_LEN=32 bytes
MAC_KEY_LEN=32 bytes
KEY_LEN=64 bytes
HMAC-SHA512-LEN=32 bytes Exemplary Algorithm:
KEY=KMS-Decrypt(mongodb.keystore.find({_id: UUID}))

In some embodiments, it is an error if the data returned from MongoDB is not equal to the required KEY_LEN.

$MAC\_KEY = KEY[0 \ldots 31]$ $ENC\_KEY = KEY[32 \ldots 63]$ $P$ = Plain Text $PS = PKCS\#7$ Padding $IV$ = Secure Random or Deterministic $S = CBC\text{-}ENC(ENC\_KEY, IV, P||PS) = IV||\text{Encrypted Blocks}$ $A$ = Authenticated Data = fle_blob_subtype + key_uuid[16] + original_bson_type $AL$ = Length($A$) in Big Endian (i.e. Network Byte Order)

64-bit unsigned integer $T = MAC(MAC\_KEY, A||S||AL)$ $C = S||T$

Size Overhead for Encryption:
The minimum size of encrypted data is 82 bytes.
Overhead Calculation:

1 byte sub type 16 bytes key *uuid*

1 byte *bson* type $C = 16 * (INTEGER\_FLOOR(LEN(P)/16) + 2) + 32$

Note: 2 = 1 IV block + 1 Padding block = 82 Bytes

FIG. 10C shows exemplary minimal overhead for various data types according to some embodiments.

In some embodiments, certain types (MinKey, Undefined, Bool False, Bool True, NULL, Undefined) have no data and so encrypting is not supported.

Finally, the bindata data type itself may have additional overhead in some embodiments. While all BSON types have a "type" byte and a "field name", bindata has a int32 length and subtype byte so it adds an additional 5 bytes on top of the encrypted payload in some embodiments.

Having thus described several aspects and embodiments, it is to be appreciated that various alterations, modifications and improvements will readily occur to those skilled in the art. Such alterations, modifications, and improvements are intended to be part of this disclosure, and are intended to be within the spirit and scope of aspects herein. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A database system comprising:
   a database having a dynamic schema and comprising a plurality of data storage nodes, wherein the database is configured to store at least one document; and
   at least one processor configured to:
   using an encryption process at a field-level in the database having the dynamic schema, enable specification of encryption in a client access layer on a minimum of at least one data field within the at least one document; and
   manage access to the at least one data field within the at least one document such that:
   system administration privileges for the database having the dynamic schema do not enable access to a plaintext version of the at least one data field within the at least one document, and
   at least one data key enables access to the plaintext version of the at least one data field within the at least one document.

2. The database system of claim 1, wherein at least one client-controlled resource manages the at least one data key without which the at least one data field cannot be decrypted.

3. The database system of claim 2, wherein the at least one processor is configured to, using the encryption process, restrict access to the at least one data key to users having permission within the client access layer.

4. The database system of claim 2, wherein the at least one document is associated with at least the at least one data key.

5. The database system of claim 2, wherein the at least one processor is further configured to:
receive a request for the at least one data key; and
process the request.

6. The database system of claim 1, wherein the at least one processor is configured to use the encryption process under a zero trust security model.

7. The database system of claim 1, wherein the database follows an eventual consistency model.

8. The database system of claim 1, wherein the encryption process is independent of database access policy.

9. The database system of claim 1, wherein root privileges for the database do not enable access to the plaintext version of the at least one data field within the at least one document.

10. The database system of claim 1, wherein the at least one processor is configured to:
manage access, by users employing at least one client-controlled resource in the client access layer, to plaintext data stored in the plurality of data storage nodes; and
restrict access to the plaintext data by other users, wherein the other users include users with system administration privileges for the database and administrators of processing resources hosting the database.

11. A method for managing data security for a database having a dynamic schema and comprising a plurality of data storage nodes, wherein the database is configured to store at least one document, the method comprising:
using an encryption process at a field-level in the database having the dynamic schema, enabling specification of encryption in a client access layer on a minimum of at least one data field within the at least one document; and
managing access to the at least one data field within the at least one document such that:
system administration privileges for the database having the dynamic schema do not enable access to a plaintext version of the at least one data field within the at least one document, and
at least one data key enables access to the plaintext version of the at least one data field within the at least one document.

12. At least one computer-readable storage medium having instructions recorded thereon which, when executed by a computer, cause the computer to perform a method for managing data security for a database having a dynamic schema and comprising a plurality of data storage nodes, wherein the database is configured to store at least one document, the method comprising:
using an encryption process at a field-level in the database having the dynamic schema, enabling specification of encryption in a client access layer on a minimum of at least one data field within the at least one document; and
managing access to the at least one data field within the at least one document such that:
system administration privileges for the database having the dynamic schema do not enable access to a plaintext version of the at least one data field within the at least one document, and
at least one data key enables access to the plaintext version of the at least one data field within the at least one document.

13. The at least one computer-readable storage medium of claim 12, wherein at least one client-controlled resource manages the at least one data key without which the at least one data field cannot be decrypted.

14. The at least one computer-readable storage medium of claim 13, wherein the method further comprises, using the encryption process, restricting access to the at least one data key to users having permission within the client access layer.

15. The at least one computer-readable storage medium of claim 13, wherein the at least one document is associated with at least the at least one data key.

16. The at least one computer-readable storage medium of claim 13, wherein the method further comprises:
receiving a request for the at least one data key; and
processing the request.

17. The at least one computer-readable storage medium of claim 12, wherein the method further comprises using the encryption process under a zero trust security model.

18. The at least one computer-readable storage medium of claim 12, wherein the encryption process is independent of database access policy.

19. The at least one computer-readable storage medium of claim 12, wherein root privileges for the database do not enable access to the plaintext version of the at least one data field within the at least one document.

20. The at least one computer-readable storage medium of claim 12, the method further comprising:
managing access, by users employing at least one client-controlled resource in the client access layer, to plaintext data stored in the plurality of data storage nodes; and
restricting access to the plaintext data by other users, wherein the other users include users with system administration privileges for the database and administrators of processing resources hosting the database.

* * * * *